(12) United States Patent
Lee et al.

(10) Patent No.: US 11,985,409 B2
(45) Date of Patent: May 14, 2024

(54) CAMERA MODULE

(71) Applicant: LG INNOTEK CO., LTD., Seoul (KR)

(72) Inventors: Woong Lee, Seoul (KR); Chul Kim, Seoul (KR); Chang Hyuck Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 351 days.

(21) Appl. No.: 17/420,941

(22) PCT Filed: Jan. 6, 2020

(86) PCT No.: PCT/KR2020/000168
§ 371 (c)(1),
(2) Date: Jul. 6, 2021

(87) PCT Pub. No.: WO2020/145587
PCT Pub. Date: Jul. 16, 2020

(65) Prior Publication Data
US 2022/0094830 A1  Mar. 24, 2022

(30) Foreign Application Priority Data
Jan. 7, 2019  (KR) ........................ 10-2019-0001891

(51) Int. Cl.
*H04N 23/58* (2023.01)
*H04N 13/254* (2018.01)
(Continued)

(52) U.S. Cl.
CPC ........... *H04N 23/58* (2023.01); *H04N 13/254* (2018.05); *H04N 23/54* (2023.01); *H04N 23/55* (2023.01); *H04N 23/56* (2023.01); *H04N 23/951* (2023.01)

(58) Field of Classification Search
None
See application file for complete search history.

(56) References Cited

U.S. PATENT DOCUMENTS

2017/0127036 A1  5/2017 You et al.
2019/0104239 A1*  4/2019 Aschwanden ........... G02B 3/14

FOREIGN PATENT DOCUMENTS

JP   2000278614 A  * 10/2000
JP   2013-025035 A    2/2013
(Continued)

OTHER PUBLICATIONS

English translation of JP-2000278614-A, Kohata, Oct. 2000 (Year: 2000).*

*Primary Examiner* — James M Hannett
(74) *Attorney, Agent, or Firm* — Birch, Stewart, Kolasch & Birch, LLP

(57) ABSTRACT

A camera module according to the present embodiment comprises: a light-emitting unit for outputting light to an object; a filter allowing the light to pass therethrough; at least one sheet of lens disposed on the filter and condensing the light reflected from the object; a sensor including a plurality of pixels aligned in an array and generating an electrical signal from the light condensed by the lens; and a tilt unit for tilting the filter such that an optical path of the light having passed through the filter is repeatedly moved according to a predetermined rule, wherein the tilt unit includes: a tilting driver for generating an output signal synchronized with an exposure cycle of the sensor on the basis of a trigger signal input from the sensor; and a tilting actuator for tilting the filter diagonally by the output signal.

20 Claims, 22 Drawing Sheets

(51) Int. Cl.
*H04N 23/54* (2023.01)
*H04N 23/55* (2023.01)
*H04N 23/56* (2023.01)
*H04N 23/951* (2023.01)

(56) References Cited

FOREIGN PATENT DOCUMENTS

| | | |
|---|---|---|
| KR | 10-2014-0094927 A | 7/2014 |
| KR | 10-1629610 B1 | 6/2016 |
| KR | 10-2017-0050058 A | 5/2017 |
| KR | 10-2018-0000964 A | 1/2018 |
| WO | WO-2017149092 A2 * | 9/2017 ........... G02B 13/001 |

* cited by examiner

[FIG. 1]
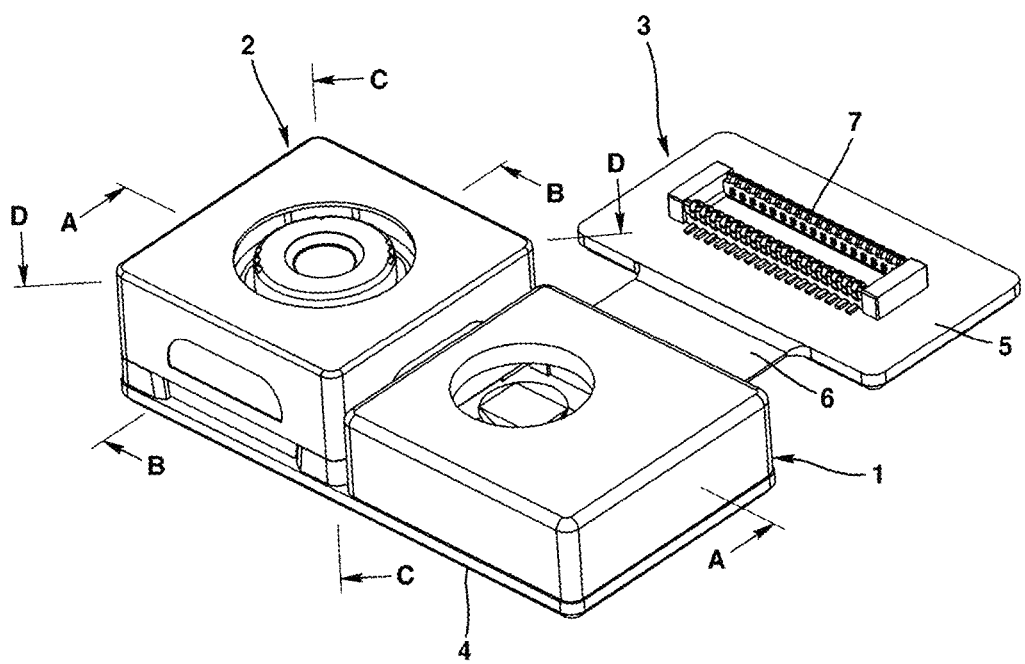

[FIG.2]
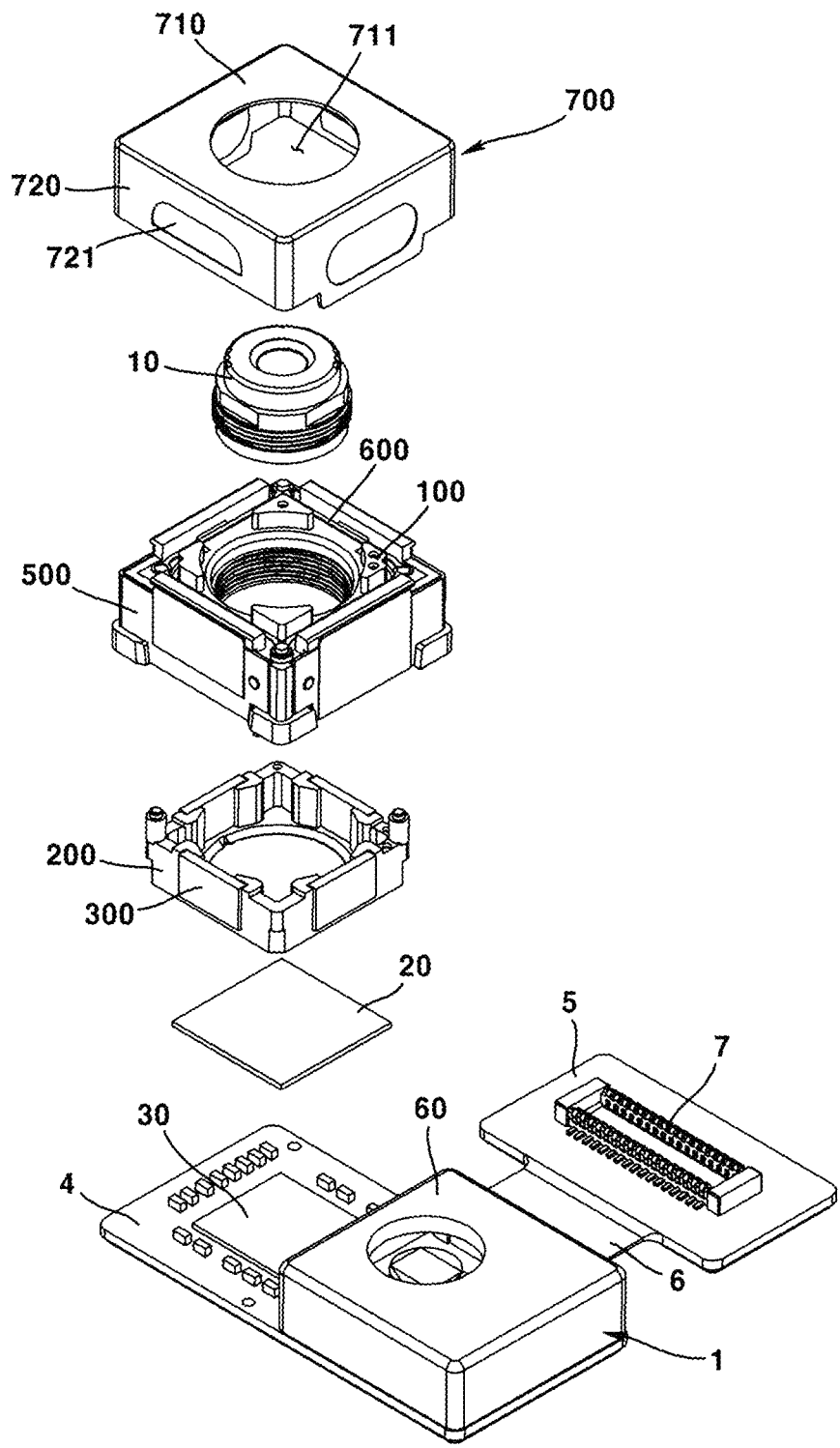

[FIG.3a]
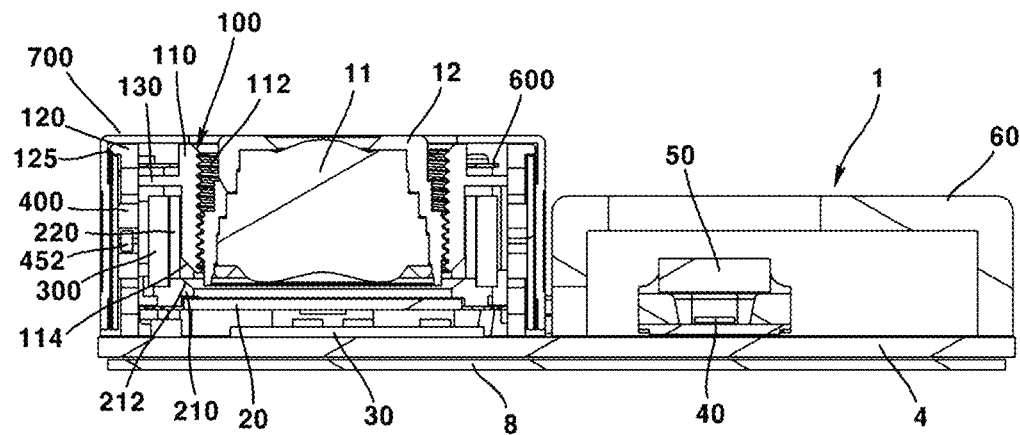
[FIG.3b]
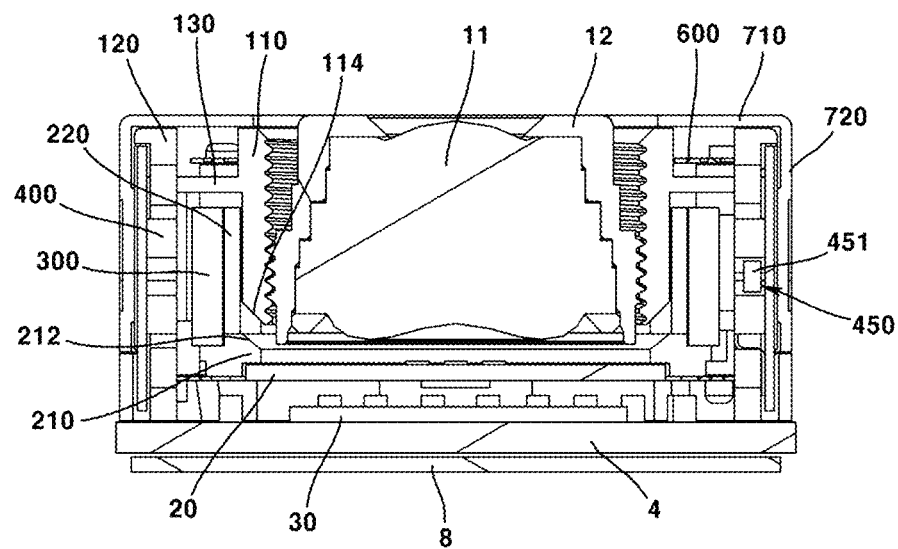

[FIG.4a]
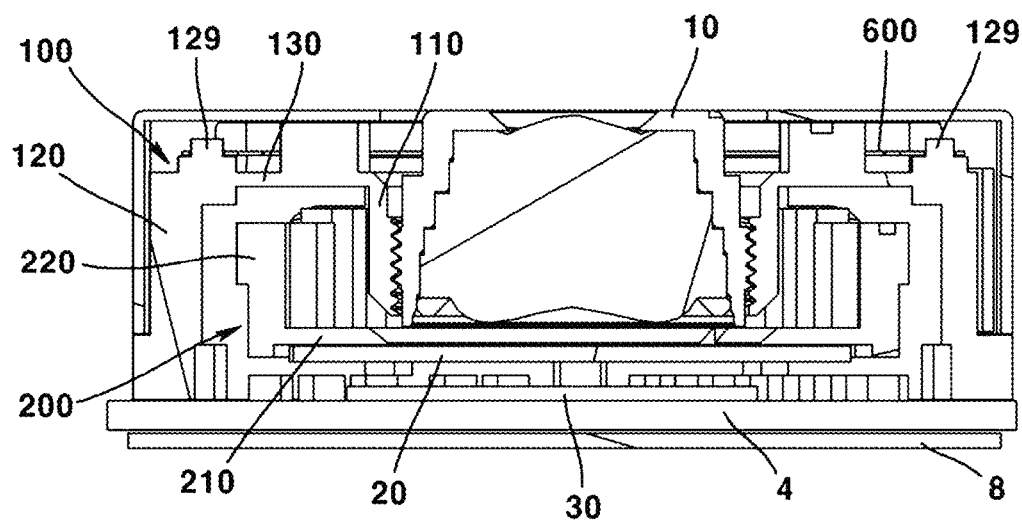
[FIG.4b]
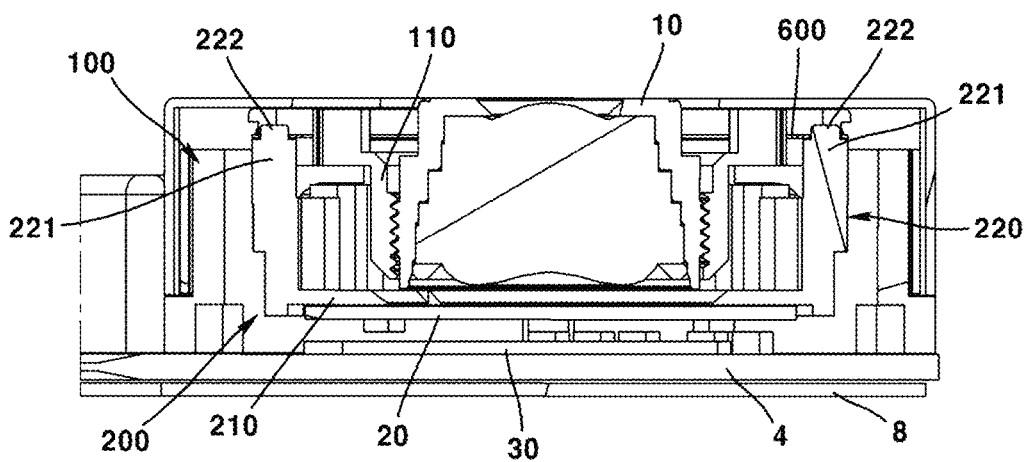

[FIG.5]
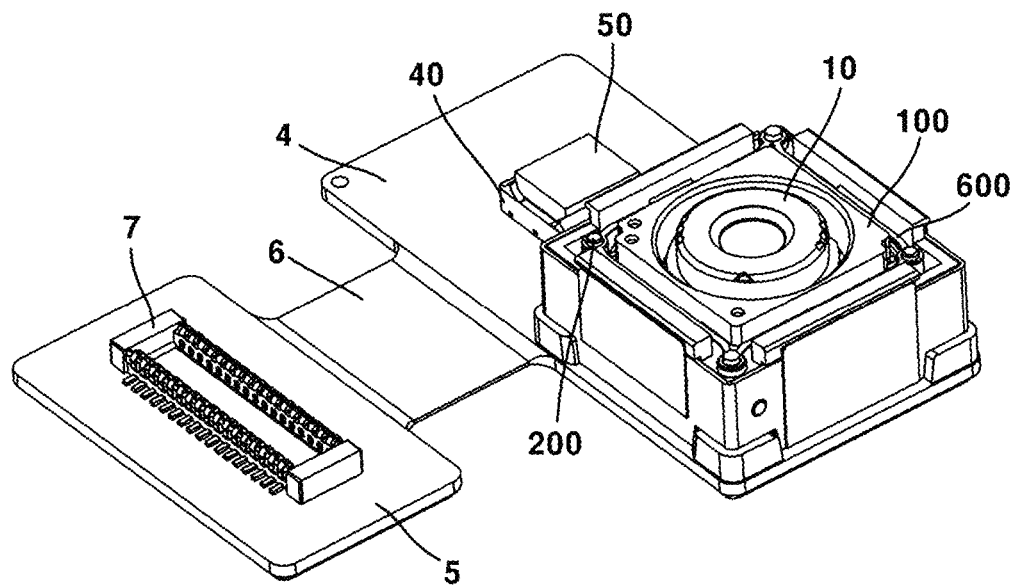
[FIG.6]
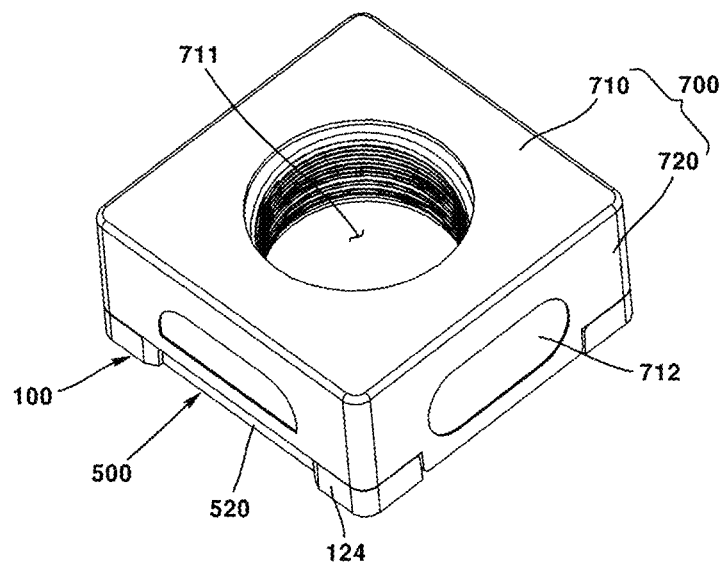

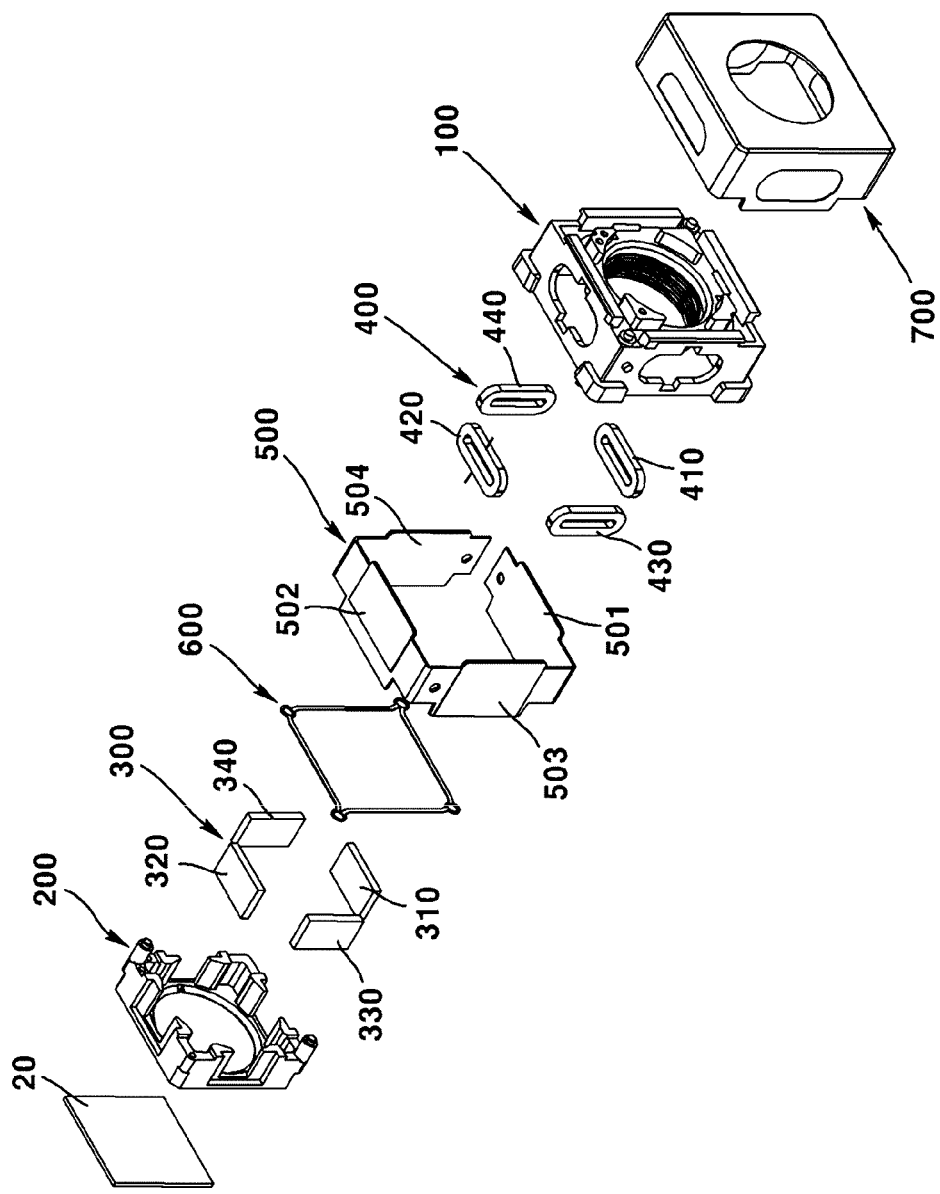
[FIG.7]

[FIG.8]
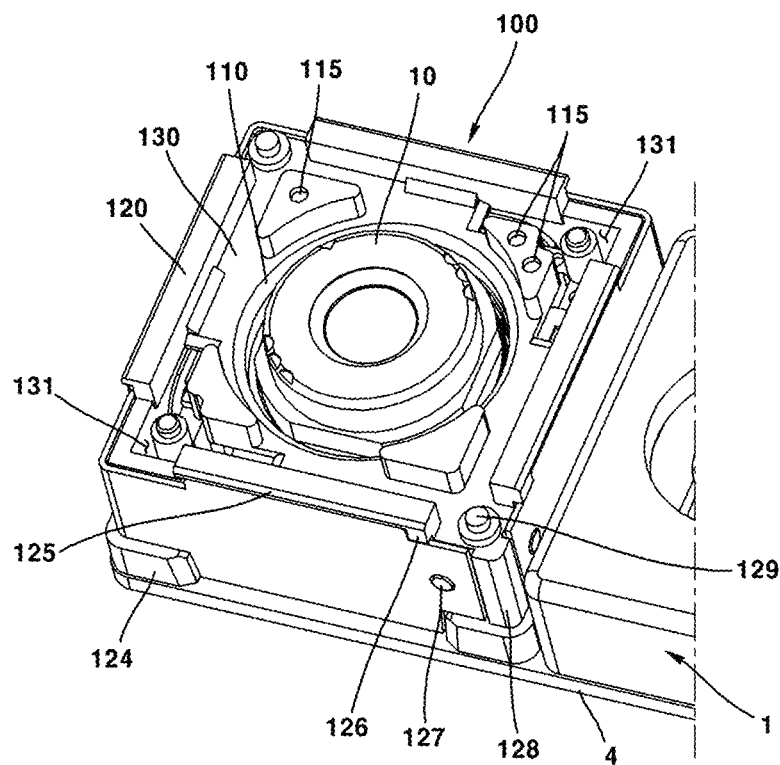
[FIG.9]
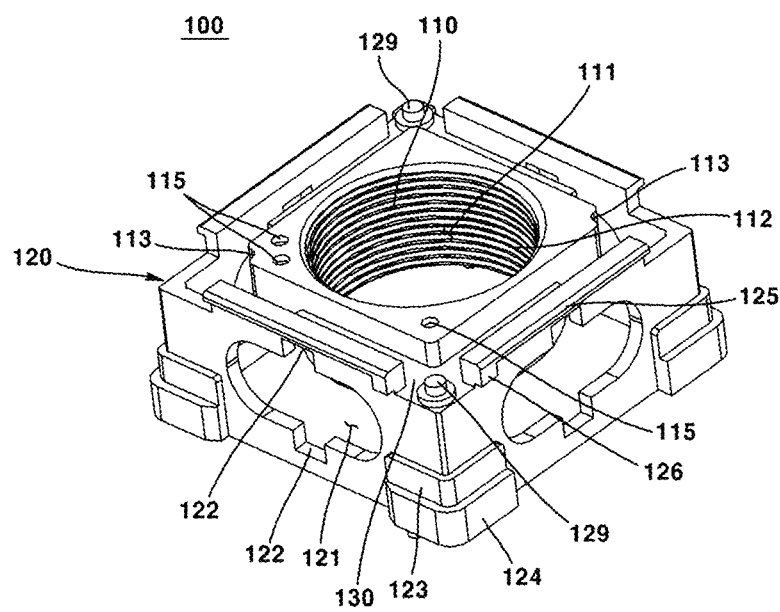

[FIG.10]
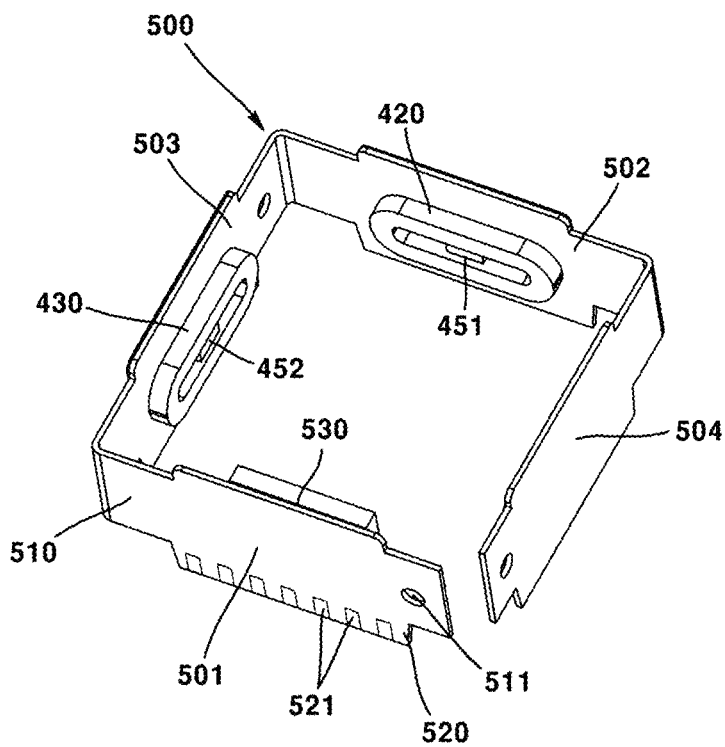
[FIG.11]
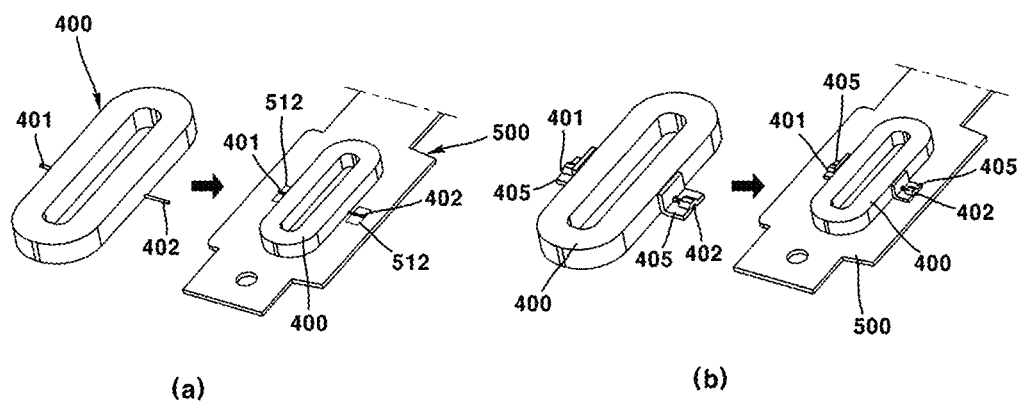
(a)  (b)

[FIG.12]
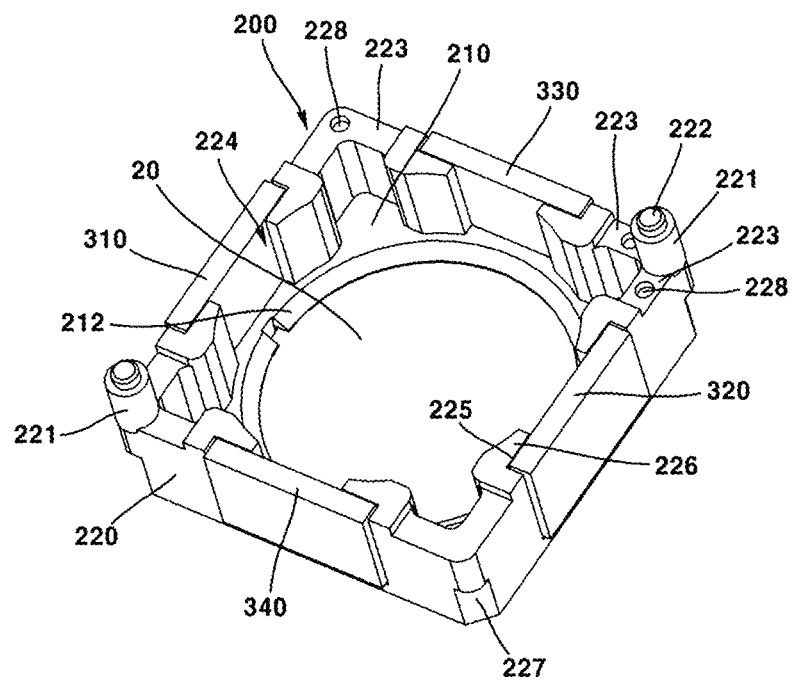
[FIG.13]
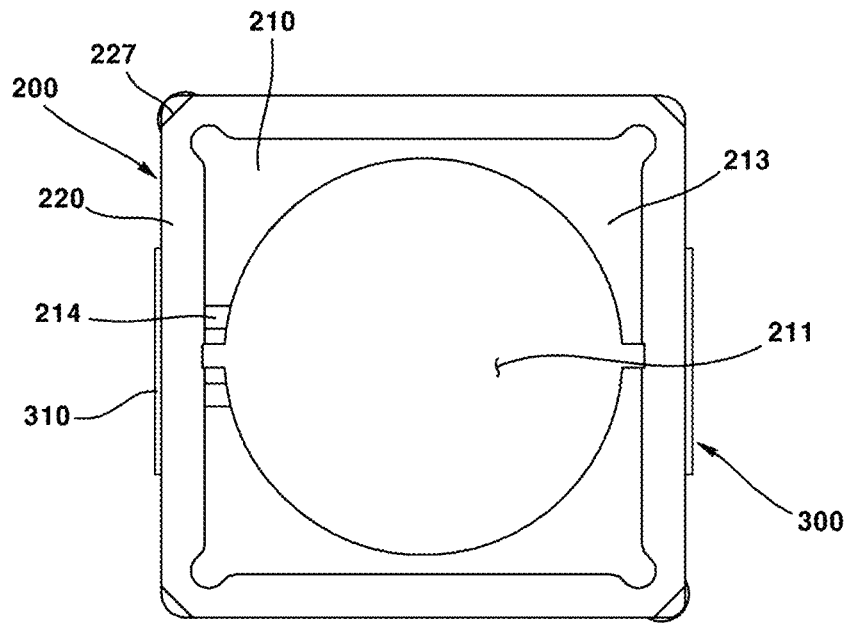

[FIG.14]
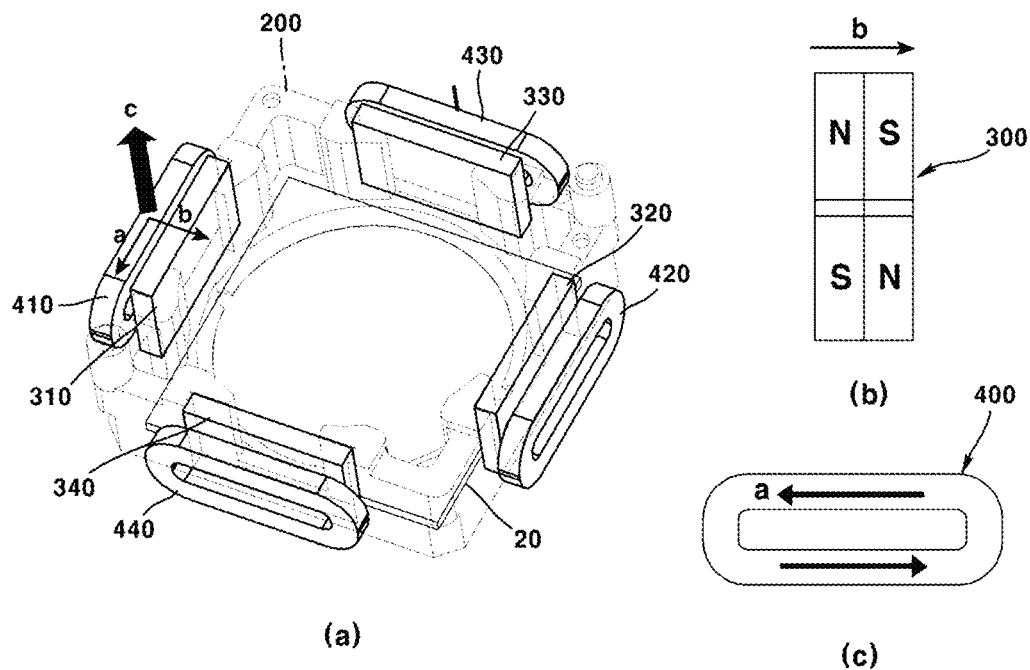

[FIG.15]
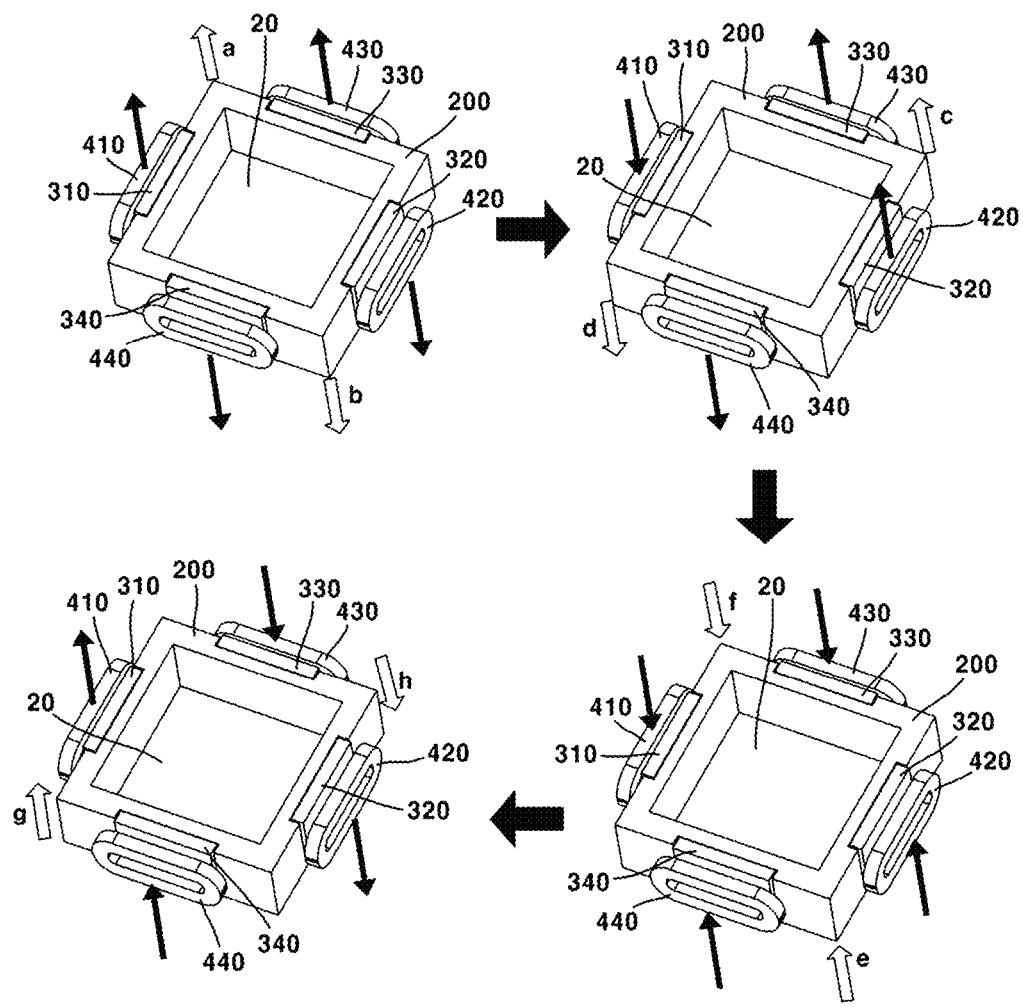

[FIG.16]
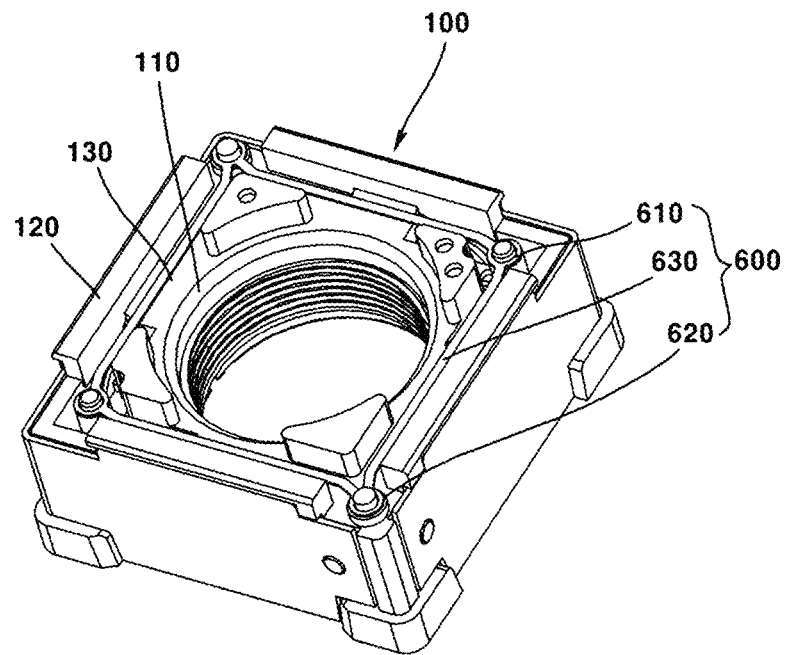
[FIG.17]
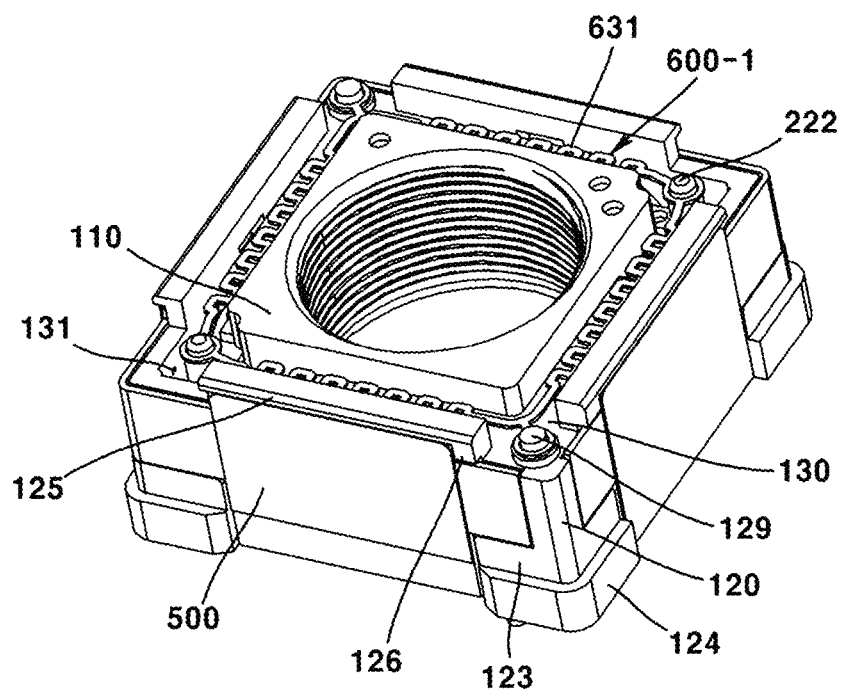

[FIG.18]
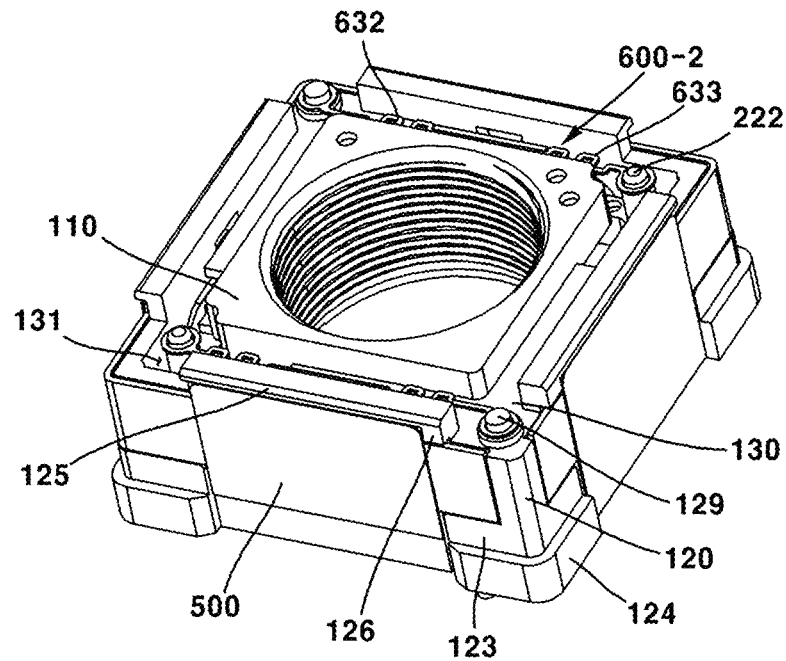
[FIG.19]
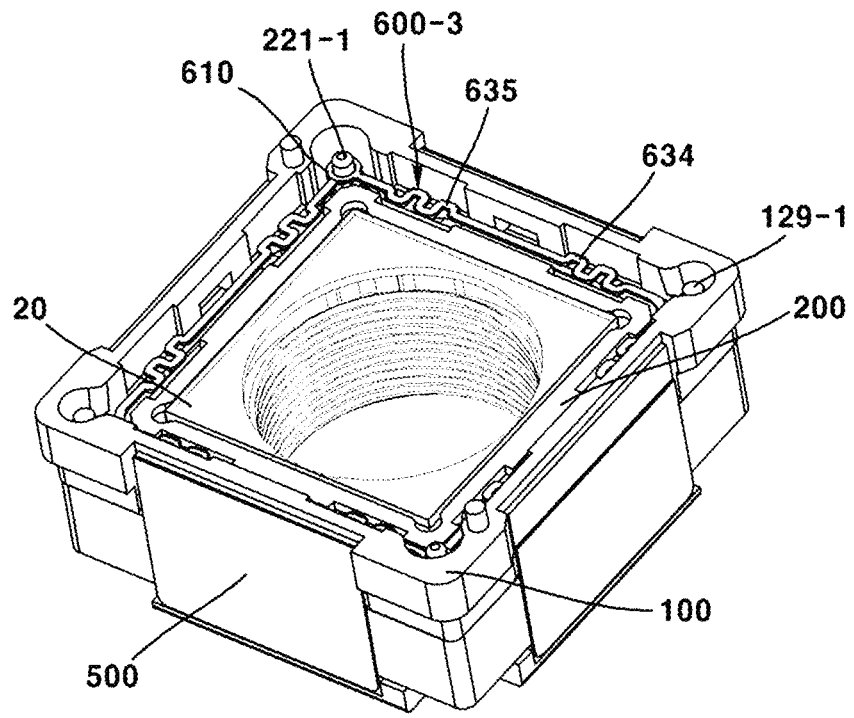

[FIG.20]
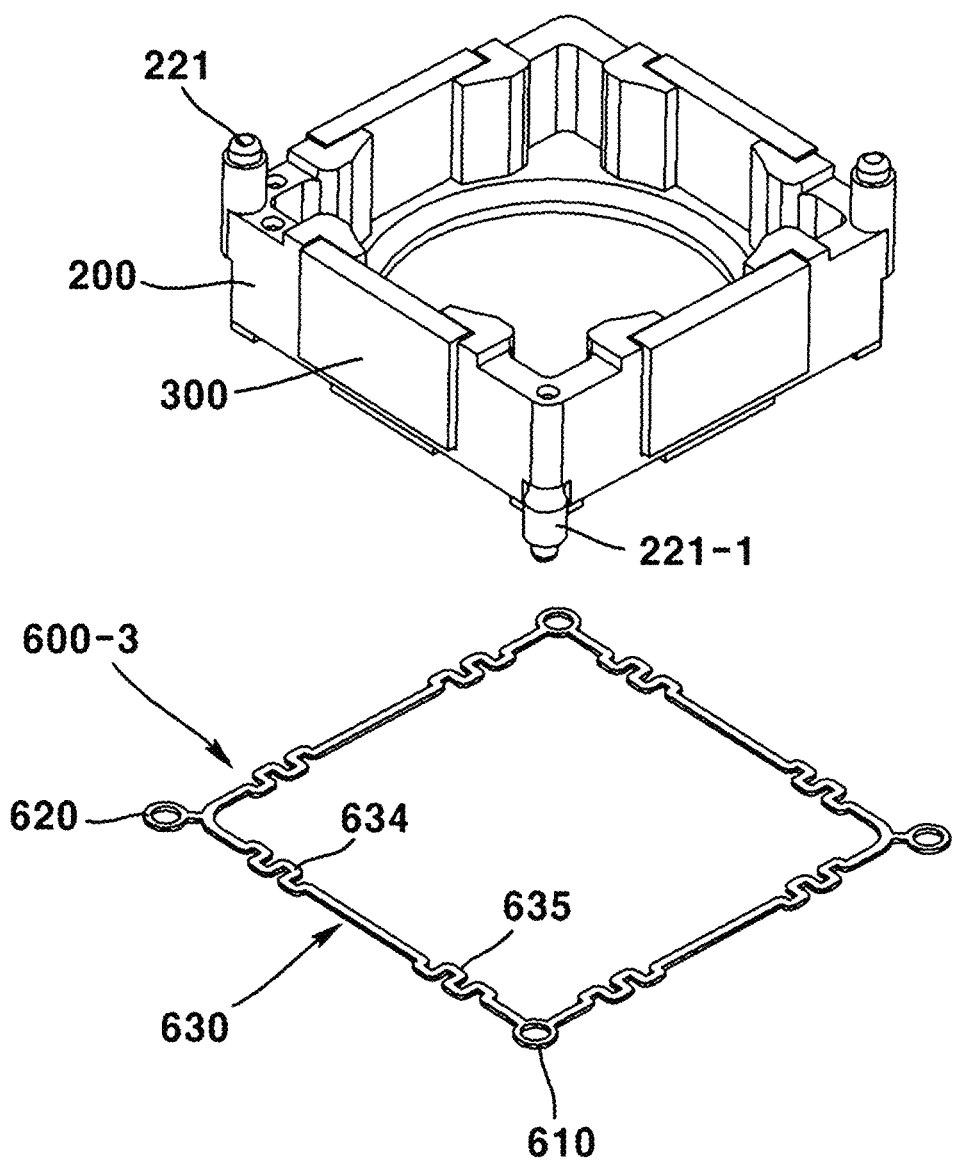

[FIG.21]
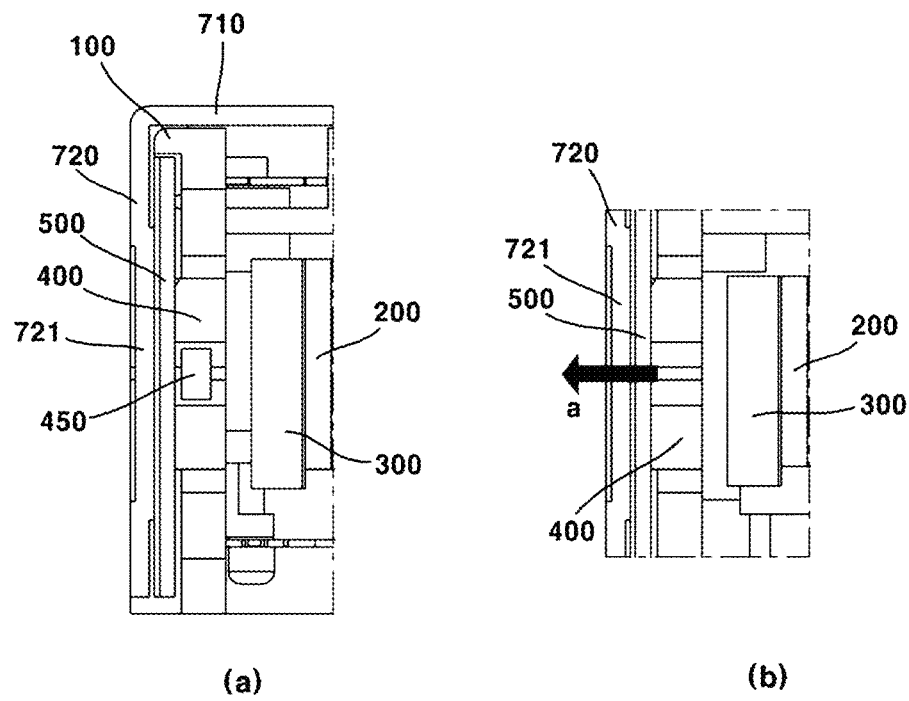
(a)           (b)
[FIG.22]
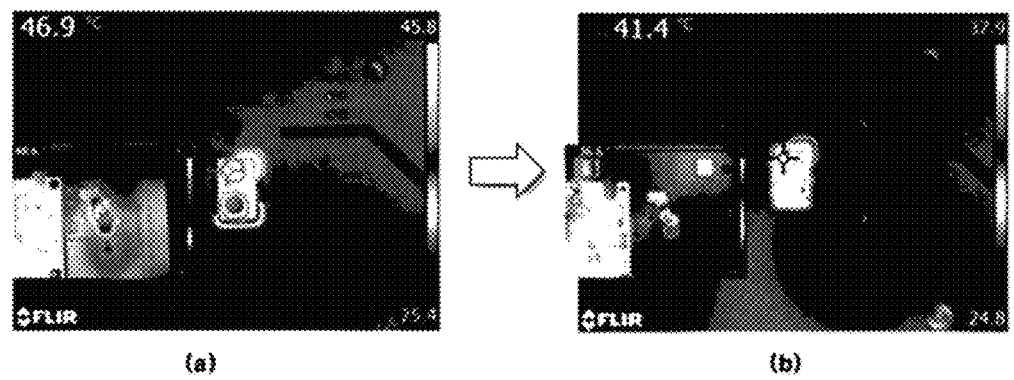
(a)           (b)

[FIG.23]
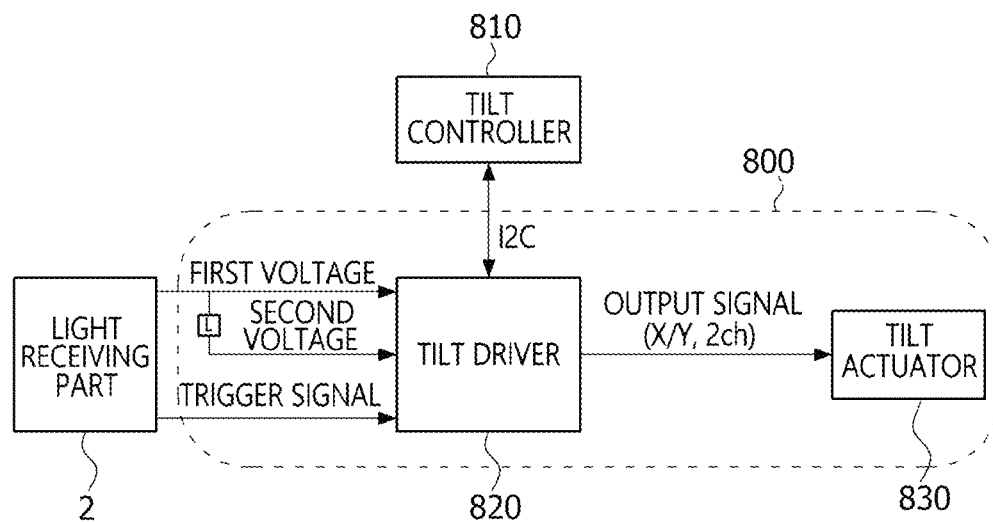
(a)
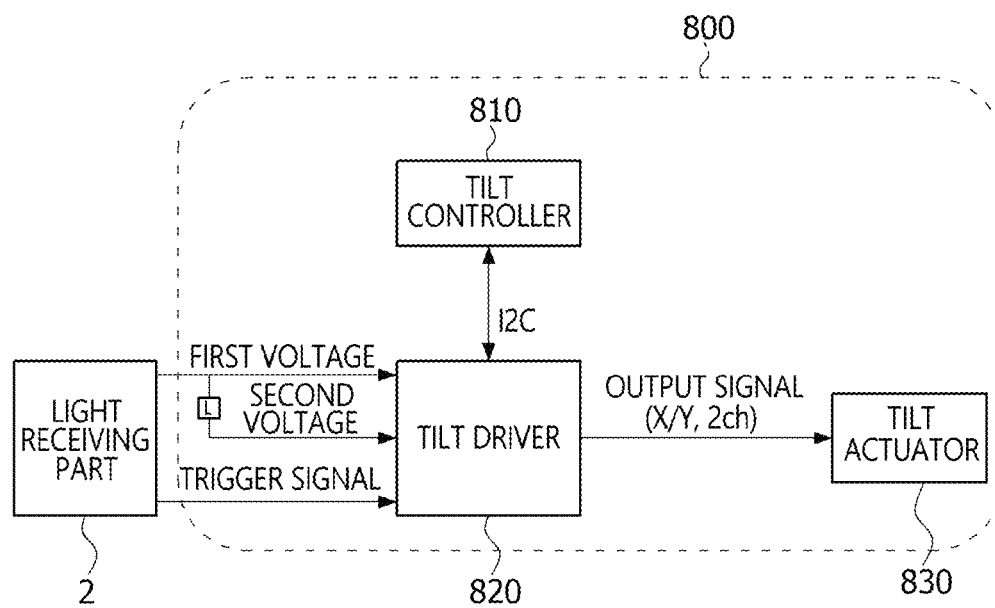
(b)

[FIG.24]
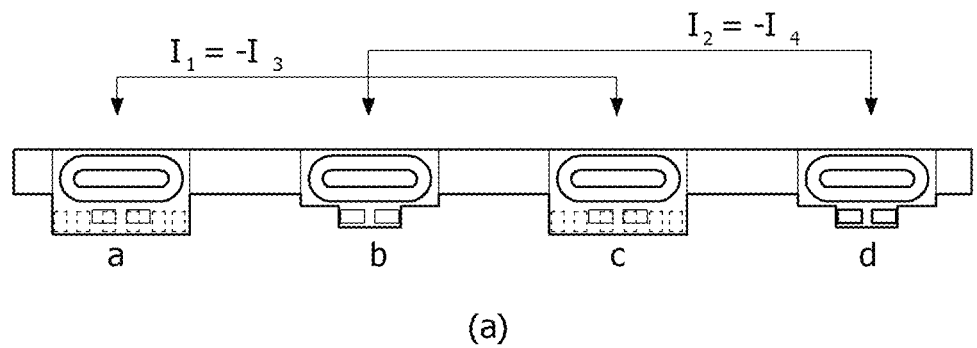
(a)
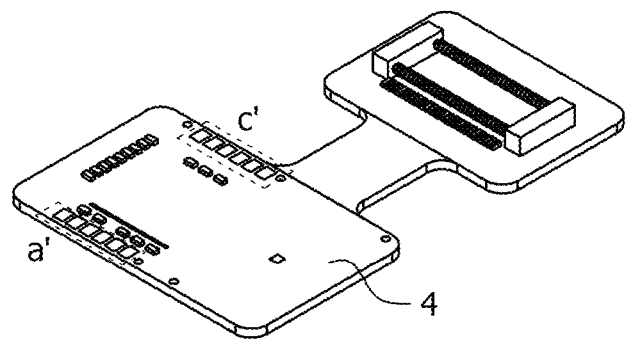
(b)
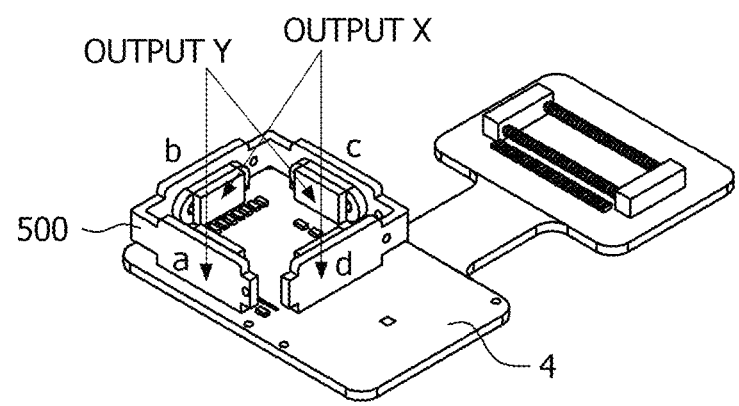
(c)

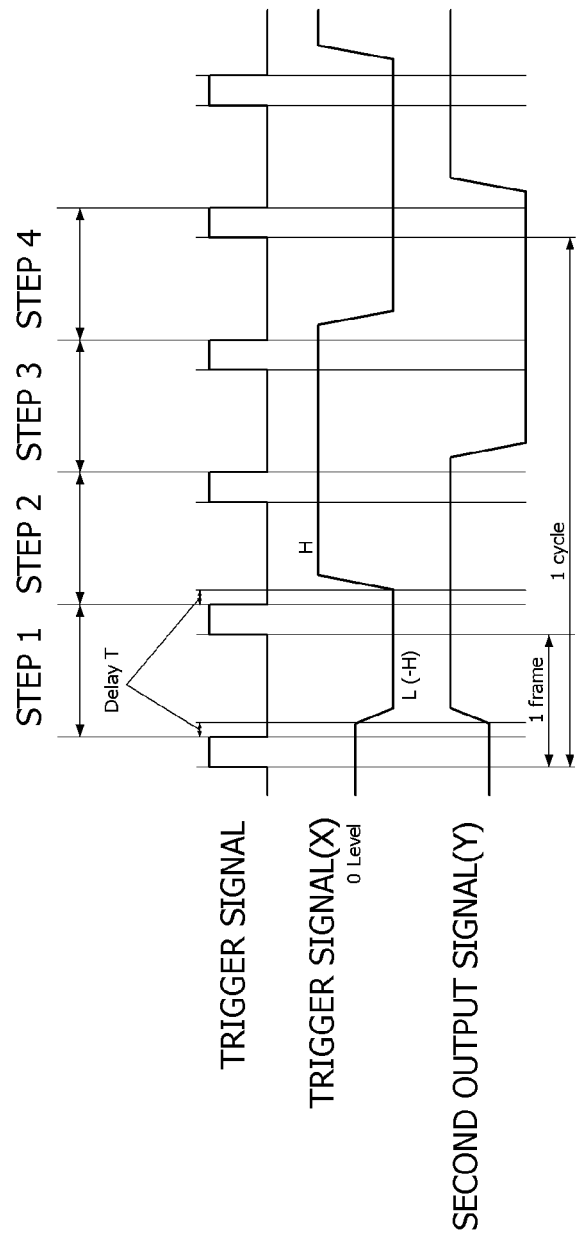
[FIG. 25]

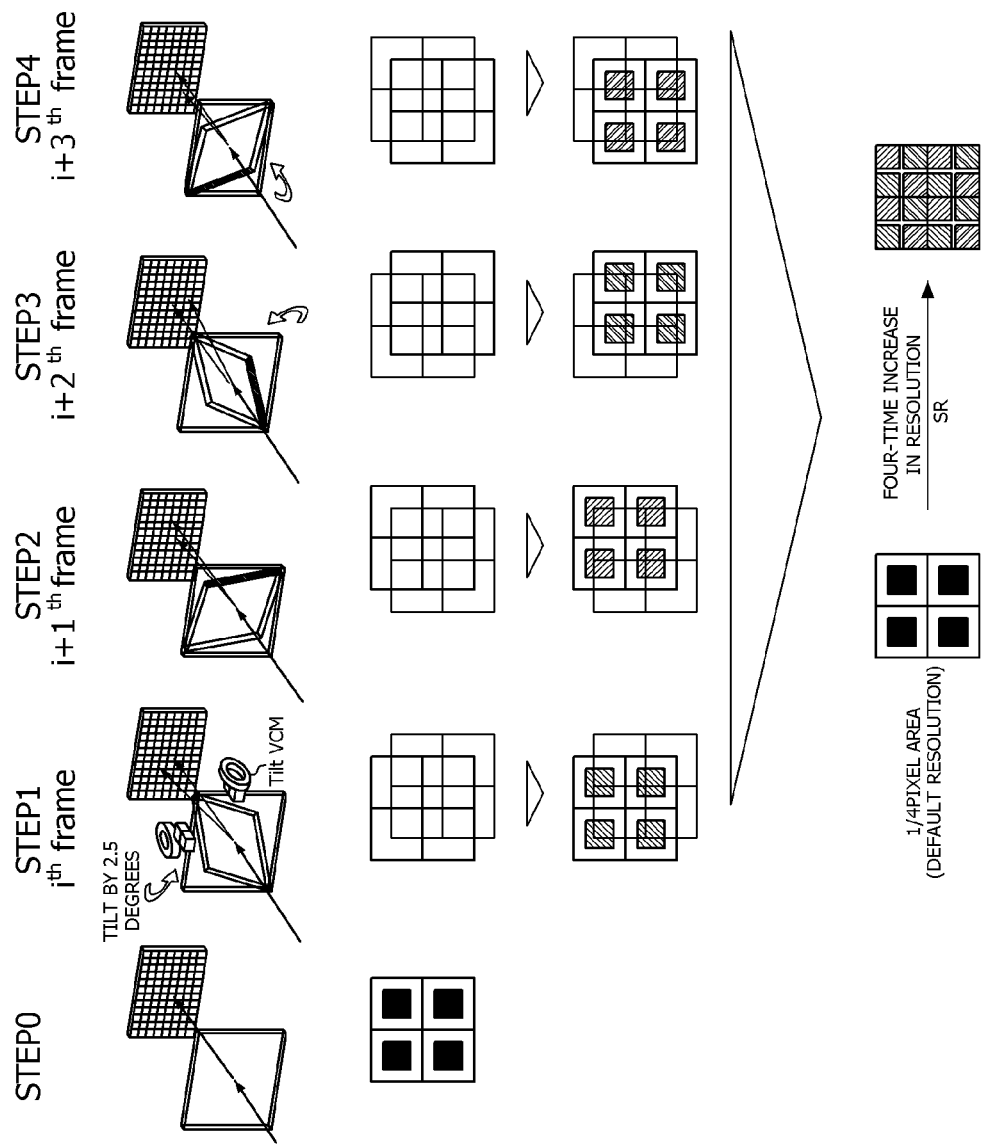
[FIG. 26]

[FIG.27]
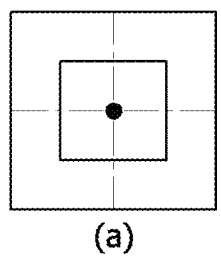
(a)
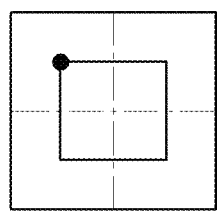  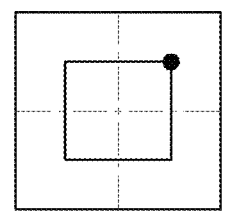
(b)                                    (c)
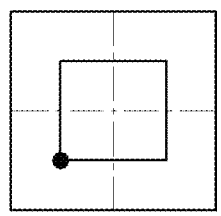  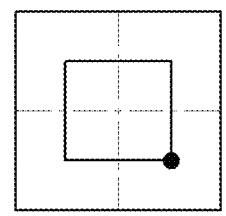
(e)                                    (d)

[FIG.28]
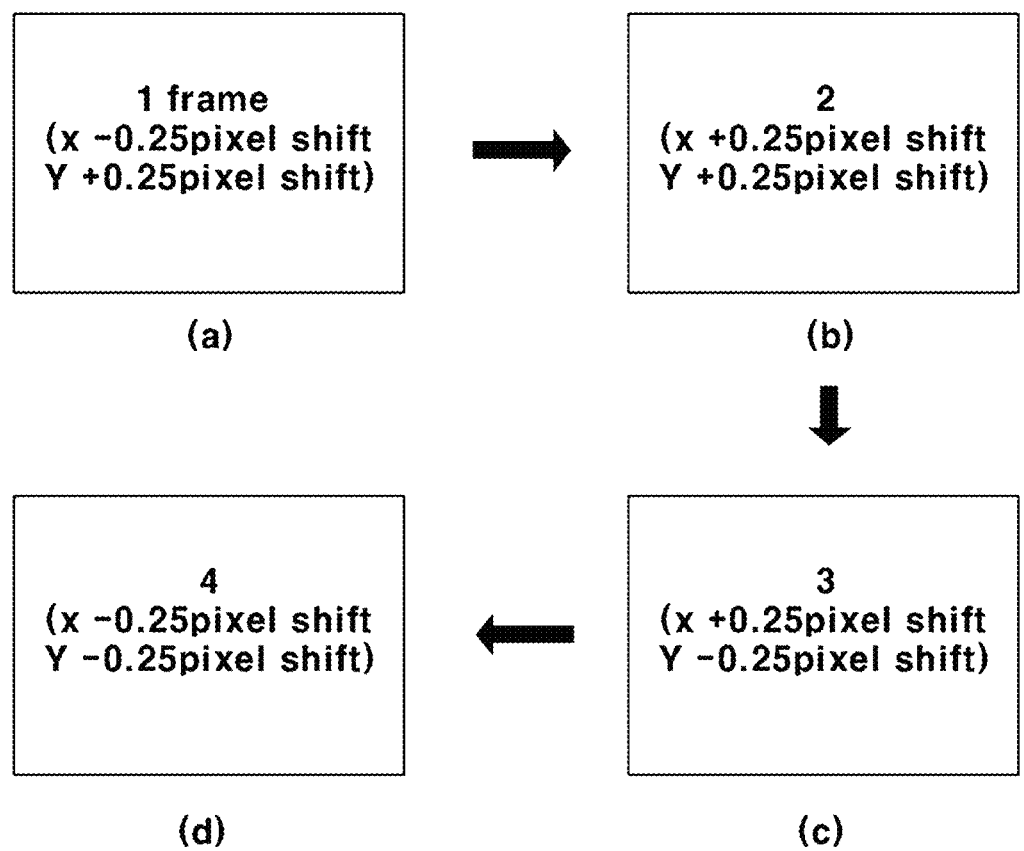

[FIG.29]
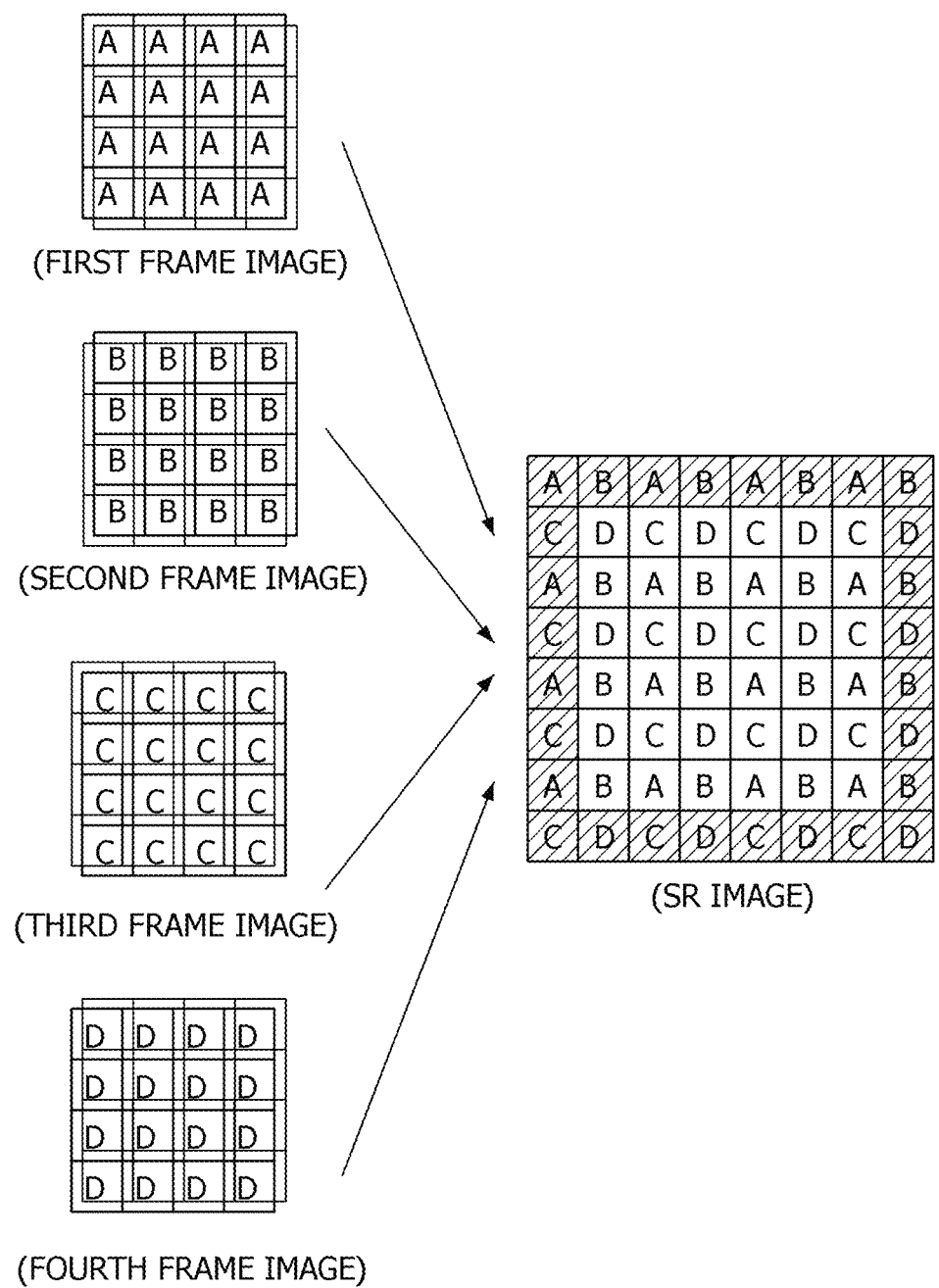

CAMERA MODULE

CROSS REFERENCE TO RELATED APPLICATIONS

This application is the National Phase of PCT International Application No. PCT/KR2020/000168, filed on Jan. 6, 2020, which claims priority under 35 U.S.C. 119(a) to Patent Application No. 10-2019-0001891, filed in the Republic of Korea on Jan. 7, 2019, all of which are hereby expressly incorporated by reference into the present application.

TECHNICAL FIELD

The present invention relates to a camera module.

BACKGROUND ART

Three-dimensional content is applied in many fields such as education, manufacturing, and autonomous driving, as well as games and culture. Depth information (depth map) is required to acquire three-dimensional content. Depth information is information indicating a distance in a space and indicates perspective information at one point in a two-dimensional image with respect to another point therein.

In recent years, a time-of-flight (ToF) method has come to the fore as a method of acquiring depth information. According to the ToF method, the ToF, that is, the time taken for light emitted to an object to return due to being reflected by the object, is measured to calculate a distance from the object. The greatest advantage of the ToF method is that it rapidly provides distance information on a three-dimensional space in real time. Also, it allows a user to obtain accurate distance information without applying a separate algorithm or performing correction in terms of hardware. In addition, it allows accurate depth information to be acquired even when a very close subject is measured or a moving subject is measured.

However, the current ToF method has a problem in that information that may be obtained per frame, that is, resolution, is low.

The number of pixels of a sensor may be increased to increase the resolution, but in this case, there is a problem that the volume and manufacturing costs of a camera module significantly increase.

DISCLOSURE

Technical Problem

The present embodiment is directed to providing a camera module capable of increasing resolution using a time-of-flight (ToF) method.

More specifically, the present embodiment is directed to providing a camera module capable of performing a super resolution (SR) technique.

Technical Solution

The present embodiment provides a camera module including a light emitting portion configured to output light to an object, a filter configured to cause the light to pass therethrough, at least one lens disposed on the filter to condense the light reflected from the object, a sensor including a plurality of pixels arranged in an array and configured to generate an electrical signal from the light condensed by the lens, and a tilting portion configured to tilt the filter so that an optical path of the light that passes through the filter repeatedly moves according to a predetermined rule, wherein the tilting portion includes a tilting driver configured to, on the basis of a trigger signal input from the sensor, generate an output signal synchronized with an integration time of the sensor and a tilting actuator configured to tilt the filter in a diagonal direction through the output signal.

The tilting actuator may include a housing, an elastic member connected to the housing, a holder connected to the elastic member and the filter, a magnet disposed in the holder, a coil facing the magnet, and a lens module coupled to the housing, the magnet may include a first magnet, a second magnet disposed opposite to the first magnet, a third magnet, and a fourth magnet disposed opposite to the third magnet, and the coil may include a first coil facing the first magnet, a second coil facing the second magnet, a third coil facing the third magnet, and a fourth coil facing the fourth magnet.

A direction of a force generated due to an interaction between the first magnet and the first coil may be a direction opposite to a direction of a force generated due to an interaction between the second magnet and the second coil, and a direction of a force generated due to an interaction between the third magnet and the third coil may be a direction opposite to a direction of a force generated due to an interaction between the fourth magnet and the fourth coil.

The first coil and the third coil may be disposed in an antiparallel structure in which directions of current flowing in the coils are opposite to each other, and the second coil and the fourth coil may be disposed in an antiparallel structure in which directions of current flowing in the coils are opposite to each other.

The output signal may include a first output signal input to the first coil and the third coil and a second output signal input to the second coil and the fourth coil.

The predetermined rule may include a first tilt sequence, a second tilt sequence, a third tilt sequence, and a fourth tilt sequence in which an optical path of the light that passes through the filter is disposed at different positions.

The tilting portion may tilt the filter so that any one combination in which the first to fourth tilt sequences are sequentially performed is repeated.

In each of the first to fourth tilt sequences, the first output signal and the second output signal may output a high-level current value whose level is higher than a predetermined reference current level or output a low-level current value whose level is lower than the reference current level.

The first output signal and the second output signal may output current values of different levels in the first tilt sequence and the third tilt sequence and may output current values of the same level in the second tilt sequence and the fourth tilt sequence.

The high-level current value and the low-level current value may be independently set in each of the first to fourth tilt sequences.

DESCRIPTION OF DRAWINGS

FIG. 1 is a perspective view of a camera module according to the present embodiment.

FIG. 2 is an exploded perspective view of the camera module according to the present embodiment.

FIG. 3A is a cross-sectional view of the camera module according to the present embodiment that is taken along line A-A of FIG. 1.

FIG. 3B is a cross-sectional view of the camera module according to the present embodiment that is taken along line B-B of FIG. 1.

FIG. 4A is a cross-sectional view of the camera module according to the present embodiment that is taken along line C-C of FIG. 1.

FIG. 4B is a cross-sectional view of the camera module according to the present embodiment that is taken along line D-D of FIG. 1.

FIG. 5 is a perspective view of a partial configuration of the camera module according to the present embodiment.

FIG. 6 is a perspective view of some configurations of a light receiving portion of the camera module according to the present embodiment.

FIG. 7 is an exploded perspective view of the configurations of the light receiving portion of FIG. 6.

FIG. 8 is a perspective view of some configurations of the camera module according to the present embodiment.

FIG. 9 is a perspective view of a housing of the camera module according to the present embodiment.

FIG. 10 is a perspective view of a substrate and a coil of the camera module according to the present embodiment.

FIG. 11A is a view illustrating coupling between the coil and the substrate of the camera module according to the present embodiment, and FIG. 11B is a view illustrating coupling between the coil and the substrate of the camera module according to a modified example.

FIG. 12 is a perspective view of a holder and a magnet of the camera module according to the present embodiment.

FIG. 13 is a bottom view of the holder and the magnet of FIG. 12.

FIG. 14 is a view for describing a Lorentz force between the magnet and the coil in the present embodiment.

FIG. 15 is a view for describing diagonal tilting control of a filter in the present embodiment.

FIG. 16 is a perspective view of a portion of the camera module including an elastic member according to the present embodiment.

FIG. 17 is a perspective view of a portion of the camera module including an elastic member according to a modified example.

FIG. 18 is a perspective view of a portion of the camera module including an elastic member according to another modified example.

FIG. 19 is a bottom perspective view of a portion of the camera module including an elastic member according to still another modified example.

FIG. 20 is an exploded perspective view illustrating some configurations of the portion of the camera module illustrated in FIG. 19.

FIG. 21A is a cross-sectional view illustrating a coupling structure of a cover, a substrate, and a coil of the camera module according to the present embodiment, and FIG. 21B is an enlarged view of a portion of FIG. 21A and is a view illustrating a flow of heat dissipation according to conduction.

FIG. 22A is temperature measurement data of a camera module according to a comparative example, and FIG. 22B is temperature measurement data of the camera module according to the present embodiment.

FIG. 23 is a view for describing a tilting portion according to the present embodiment.

FIG. 24 is a view for specifically describing a tilting actuator.

FIG. 25 is a view for describing a driving sequence of the tilting portion.

FIG. 26 illustrates a process of moving an optical path according to an embodiment of the present invention.

FIG. 27 is a conceptual diagram conceptually and sequentially illustrating a plurality of images acquired for a super resolution (SR) technique in the camera module according to the present embodiment.

FIG. 28 is a view sequentially illustrating images of first to fourth frames that are acquired for the SR technique in the camera module according to the present embodiment.

FIG. 29 is a view for describing an SR image.

MODES OF THE INVENTION

Hereinafter, exemplary embodiments of the present invention will be described in detail with reference to the accompanying drawings.

However, the technical idea of the present invention is not limited to some embodiments described herein and may be implemented in various other forms. One or more elements of different embodiments may be selectively combined with or substituted by one another within the scope of the technical idea of the present invention.

Also, unless otherwise defined, all terms, including technical and scientific terms, used in the embodiments of the present invention may be construed as having the same meaning as commonly understood by one of ordinary skill in the art to which the present invention pertains. Generally-used terms, such as those defined in dictionaries, should be construed as having a meaning that is consistent with their meaning in the context of the relevant art.

In addition, the terms used in the embodiments of the present invention are for describing the embodiments and are not intended to limit the present invention.

In the present specification, a singular expression may include a plural expression unless the context clearly indicates otherwise. "At least one (or one or more) of A, B, and C" may include one or more of any combination that is possible by combining A, B, and C.

Also, terms such as first, second, A, B, (a), and (b) may be used in describing elements of the embodiments of the present invention. The terms are only for distinguishing the elements from other elements, and the essence, order, or the like of the corresponding elements are not limited by the terms.

In addition, a case in which a certain element is described as being "connected," "coupled," or "linked" to another element may include not only a case in which the element is directly connected, combined, or linked to the other element but also a case in which the element is "connected," "coupled," or "linked" to the other element via another element disposed therebetween.

Also, a case in which a certain element is described as being formed or disposed "on (above)" or "under (below)" another element includes not only a case in which the two elements come in direct contact with each other but also a case in which one or more other elements are formed or disposed between the two elements. Also, "on (above)" or "under (below)" may include not only an upward direction but also a downward direction with respect to one element.

Hereinafter, an optical instrument according to the present embodiment will be described.

The optical instrument may include any one of a cellular phone, a mobile phone, a smartphone, a portable smart device, a digital camera, a laptop computer, a digital broadcasting terminal, a personal digital assistant (PDA), a portable multimedia player (PMP), and a navigation system. However, the type of the optical instrument is not limited thereto, and the optical instrument may include any other device for capturing an image or a picture.

The optical instrument may include a main body. The main body may be in the form of a bar. Alternatively, the main body may be of various structures such as a slide type structure, a folder type structure, a swing type structure, and a swirl type structure in which two or more sub-bodies are coupled so as to be movable relative to each other. The main body may include a case (a casing, a housing, or a cover) that forms an exterior of the main body. For example, the main body may include a front case and a rear case. Various electronic components of the optical instrument may be embedded in a space formed between the front case and the rear case.

The optical instrument may include a display. The display may be disposed at one surface of the main body of the optical instrument. The display may output an image. The display may output an image captured by a camera.

The optical instrument may include the camera. The camera may include a time-of-flight (ToF) camera device. The ToF camera device may be disposed at a front surface of the main body of the optical instrument. In this case, the ToF camera device may be used for various types of biometric recognition, such as user's face recognition and iris recognition for security authentication of the optical instrument.

Hereinafter, a configuration of the ToF camera device according to the present embodiment will be described with reference to the drawings.

FIG. 1 is a perspective view of a camera module according to the present embodiment, FIG. 2 is an exploded perspective view of the camera module according to the present embodiment, FIG. 3A is a cross-sectional view of the camera module according to the present embodiment that is taken along line A-A of FIG. 1, FIG. 3B is a cross-sectional view of the camera module according to the present embodiment that is taken along line B-B of FIG. 1, FIG. 4A is a cross-sectional view of the camera module according to the present embodiment that is taken along line C-C of FIG. 1, FIG. 4B is a cross-sectional view of the camera module according to the present embodiment that is taken along line D-D of FIG. 1, FIG. 5 is a perspective view of some configurations of the camera module according to the present embodiment, FIG. 6 is a perspective view of some configurations of a light receiving portion of the camera module according to the present embodiment, FIG. 7 is an exploded perspective view of the configurations of the light receiving portion of FIG. 6, FIG. 8 is a perspective view of some configurations of the camera module according to the present embodiment, FIG. 9 is a perspective view of a housing of the camera module according to the present embodiment, FIG. 10 is a perspective view of a substrate and a coil of the camera module according to the present embodiment, FIG. 11A is a view illustrating coupling between the coil and the substrate of the camera module according to the present embodiment, FIG. 11B is a view illustrating coupling between the coil and the substrate of the camera module according to a modified example, FIG. 12 is a perspective view of a holder and a magnet of the camera module according to the present embodiment, FIG. 13 is a bottom view of the holder and the magnet of FIG. 12, FIG. 14 is a view for describing a Lorentz force between the magnet and the coil in the present embodiment, FIG. 15 is a view for describing diagonal tilting control of a filter in the present embodiment, FIG. 16 is a perspective view of a portion of the camera module including an elastic member according to the present embodiment, FIG. 17 is a perspective view of a portion of the camera module including an elastic member according to a modified example, FIG. 18 is a perspective view of a portion of the camera module including an elastic member according to another modified example, FIG. 19 is a bottom perspective view of a portion of the camera module including an elastic member according to still another modified example, FIG. 20 is an exploded perspective view illustrating some configurations of the portion of the camera module illustrated in FIG. 19, FIG. 21A is a cross-sectional view illustrating a coupling structure of a cover, a substrate, and a coil of the camera module according to the present embodiment, FIG. 21B is an enlarged view of a portion of FIG. 21A and is a view illustrating a flow of heat dissipation according to conduction, FIG. 22A is temperature measurement data of a camera module according to a comparative example, and FIG. 22B is temperature measurement data of the camera module according to the present embodiment.

The ToF camera device may include a camera device. The ToF camera device may include a camera module.

The camera module may include a light emitting portion 1. The light emitting portion 1 may be a light emitting module, a light emitting unit, a light emitting assembly, or a light emitting device. The light emitting portion 1 may generate an output light signal and then radiate the generated output light signal to an object. Here, the light emitting portion 1 may generate and output the output light signal in the form of a pulse wave or a continuous wave. The continuous wave may be in the form of a sinusoidal wave or a squared wave. By the light emitting portion 1 generating the output light signal in the form of a pulse wave or a continuous wave, the ToF camera device may detect a phase difference between the output light signal output from the light emitting portion 1 and an input light signal that is reflected from the object and then input to a light receiving portion 2 of the ToF camera device. In the present specification, output light may refer to light that is output from the light emitting portion 1 and incident on an object, and input light may refer to light that is input to the ToF camera device after the output light output from the light emitting portion 1 reaches the object and is reflected from the object. From the standpoint of the object, the output light may be incident light, and the input light may be reflected light.

The light emitting portion 1 radiates the generated output light signal to the object during a predetermined integration time. Here, the integration time refers to a single frame time. In a case in which a plurality of frames are generated, a set integration time is repeated. For example, in a case in which the ToF camera device shoots an object at 20 frames per second (FPS), the integration time is ¹⁄₂₀ [sec]. Also, in a case in which one hundred frames are generated, the integration time may be repeated one hundred times.

The light emitting portion 1 may generate a plurality of output light signals having different frequencies. The light emitting portion 1 may sequentially and repeatedly generate a plurality of output light signals having different frequencies. Alternatively, the light emitting portion 1 may simultaneously generate a plurality of output light signals having different frequencies.

The light emitting portion 1 may include a light source 40. The light source 40 may generate light. The light source 40 may output light. The light source 40 may radiate light. The light generated by the light source 40 may be infrared light whose wavelength is in a range of 770 nm to 3,000 nm. Alternatively, the light generated by the light source 40 may be visible light whose wavelength is in a range of 380 nm to 770 nm. The light source 40 may include a light emitting diode (LED). The light source 40 may include a plurality of LEDs arranged according to a predetermined pattern. Further, the light source 40 may include an organic light emitting diode (OLED) or a laser diode (LD).

The light emitting portion 1 may include a light modulator configured to modulate light. The light source 40 may be repeatedly turned on and off at a predetermined time interval to generate an output light signal in the form of a pulse wave or a continuous wave. The predetermined time interval may be a frequency of the output light signal. The turning on and off of the light source 40 may be controlled by the light modulator. The light modulator may control the turning on and off of the light source 40 so that the light source 40 generates an output light signal in the form of a continuous wave or a pulse wave. The light modulator may control the light source 40 to generate an output light signal in the form of a continuous wave or a pulse wave through frequency modulation, pulse modulation, or the like.

The light emitting portion 1 may include a diffuser 50. The diffuser 50 may be a diffuser lens. The diffuser 50 may be disposed in front of the light source 40. Light output from the light source 40 may pass through the diffuser 50 and be incident on an object. The diffuser 50 may change a path of the light output from the light source 40. The diffuser 50 may condense the light output from the light source 40.

The light emitting portion 1 may include a cover 60. The cover 60 may be disposed to cover the light source 40. The cover 60 may be disposed on a printed circuit board (PCB) 4. The cover 60 may include an upper plate including a hole and a side plate extending from the upper plate.

The camera module may include the light receiving portion 2. The light receiving portion 2 may be a light receiving module, a light receiving unit, a light receiving assembly, or a light receiving device. The light receiving portion 2 may detect light that is output from the light emitting portion 1 and reflected from the object. The light receiving portion 2 may generate an input light signal that corresponds to the output light signal output from the light emitting portion 1. The light receiving portion 2 may be disposed parallel to the light emitting portion 1. The light receiving portion 2 may be disposed beside the light emitting portion 1. The light receiving portion 2 may be disposed in the same direction as the light emitting portion 1.

The light receiving portion 2 may include a lens module 10. The light reflected from the object may pass through the lens module 10. An optical axis of the lens module 10 and an optical axis of a sensor 30 may be aligned. The lens module 10 may be coupled to a housing 100. The lens module 10 may be fixed to the housing 100.

The light receiving portion 2 may include a filter 20. The filter 20 may be coupled to a holder 200. The filter 20 may be disposed between the lens module 10 and the sensor 30. The filter 20 may be disposed in an optical path between the object and the sensor 30. The filter 20 may filter light having a predetermined wavelength range. The filter 20 may cause light having a specific wavelength to pass therethrough. That is, the filter 20 may reflect or absorb light having a wavelength other than the specific wavelength to block the light. The filter 20 may cause infrared light to pass therethrough and may block light having a wavelength other than that within the infrared wavelength range. Alternatively, the filter 20 may cause visible light to pass therethrough and may block light having a wavelength other than that within the visible wavelength range. The filter 20 may move. The filter 20 may integrally move with the holder 200. The filter 20 may be tilted. The filter 20 may be moved to adjust an optical path. The filter 20 may, through movement, change a path of light incident on the sensor 30. The filter 20 may change a field of view (FOV) angle, a FOV direction, or the like of the incident light.

In the present embodiment, as the filter 20 is tilted in an inclined direction, the filter 20 may change a path of incident light and enable high-resolution ToF. The filter 20 may be disposed to be tilted in a diagonal direction of the filter 20 as forward current is applied to two adjacent coils among first to fourth coils 410, 420, 430, and 440 and reverse current is applied to the other two coils. The filter 20 may be tilted in the diagonal direction due to control of current that is applied to the first coil 410 and the third coil 430. The filter 20 may be disposed to be tilted in the diagonal direction of the filter 20 as current is applied to two adjacent coils among the first to fourth coils 410, 420, 430, and 440. The filter 20 may include a first edge disposed at a position that corresponds to a first corner portion of the holder 200. Here, the first edge of the filter 20 may be tilted upward along the optical axis due to the first coil 410 and the third coil 430. The filter 20 may include a third edge disposed at a position that corresponds to a third corner portion of the holder 200. Here, the third edge of the filter 20 may be tilted downward along the optical axis due to the second coil 420 and the fourth coil 440, and the first edge of the filter 20 may be further tilted upward along the optical axis due to the second coil 420 and the fourth coil 440.

The light receiving portion 2 may include the sensor 30. The sensor 30 may sense light. The sensor 30 may be an image sensor configured to sense light. The sensor 30 may detect light and output the detected light as an electrical signal. The sensor 30 may detect light having a wavelength that corresponds to a wavelength of light that is output from the light source 40. The sensor 30 may detect infrared light. Alternatively, the sensor 30 may detect visible light.

The sensor 30 may include a pixel array configured to receive light that passes through the lens module 10 and convert the received light to an electrical signal corresponding to the light, a driving circuit configured to drive a plurality of pixels included in the pixel array, and a readout circuit configured to read an analog pixel signal of each pixel. The readout circuit may compare the analog pixel signal with a reference signal and, through analog-digital conversion, generate a digital pixel signal (or image signal). Here, the digital pixel signal of each pixel included in the pixel array may constitute an image signal, and the image signal may be defined as an image frame due to being transmitted in frame units. That is, the image sensor may output a plurality of image frames.

The light receiving portion 2 may include an image synthesizer. The image synthesizer may include an image processor configured to receive an image signal from the sensor 30 and process the image signal (for example, interpolate the image signal or synthesize frames). In particular, the image synthesizer may synthesize (low-resolution) image signals of a plurality of frames into a (high-resolution) image signal of a single frame. That is, the image synthesizer may synthesize a plurality of image frames included in image signals received from the sensor 30 and may generate a synthesized result as a synthesized image. The synthesized image generated by the image synthesizer may have higher resolution than a plurality of image frames output from the sensor 30. That is, the image synthesizer may generate a high-resolution image through a super resolution (SR) technique. The plurality of image frames may include image frames that are generated as an optical path is changed to different optical paths due to movement of the filter 20.

The camera module may include the PCB 4. The light emitting portion 1 and the light receiving portion 2 may be disposed on the PCB 4. The PCB 4 may be electrically connected to the light emitting portion 1 and the light receiving portion 2.

The camera module may include a coupling portion 3. The coupling portion 3 may be electrically connected to the PCB 4. The coupling portion 3 may be connected to a configuration of the optical instrument. The coupling portion 3 may include a connector 7 connected to a configuration of the optical instrument. The coupling portion 3 may include a substrate 5 on which the connector 7 is disposed and which is connected to a connecting portion 6. The substrate 5 may be a PCB.

The camera module may include the connecting portion 6. The connecting portion 6 may connect the PCB 4 and the coupling portion 3. The connecting portion 6 may have flexibility. The connecting portion 6 may be a flexible PCB (FPCB).

The camera module may include a reinforcing plate 8. The reinforcing plate 8 may include a stiffener. The reinforcing plate 8 may be disposed on a lower surface of the PCB 4. The reinforcing plate 8 may be formed of stainless steel (SUS).

The camera module may include a lens driving device. The camera module may include a voice coil motor (VCM). The camera module may include a lens driving motor. The camera module may include a lens driving actuator.

The camera module may include a tilting portion that may provide a three-dimensional tilt to the filter 20. The tilting portion may tilt the filter so that an optical path of an input light signal that passes through the filter repeatedly moves according to a predetermined rule. To this end, the tilting portion may include a tilting driver and a tilting actuator.

In the present embodiment, the tilting driving principle of the camera module is as follows. Driving portions using a Lorentz force may be applied to four sites of the camera module. As illustrated in FIG. 15, when the Lorentz force is caused to be generated in a "positive (+) direction" in a first driving portion including the first coil 410 and a first magnet 310 and a third driving portion including the third coil 430 and a third magnet 330, and the Lorentz force is caused to be generated in a "negative (−) direction" in a second driving portion including the second coil 420 and a second magnet 320 and a fourth driving portion including the fourth coil 440 and a fourth magnet 340, an upper left diagonal line may be tilted upward (refer to "a" in FIG. 15), and conversely, a lower right diagonal line may be tilted downward (refer to "b" in FIG. 15). Then, when the Lorentz force is caused to be generated in the "positive (+) direction" in the second driving portion including the second coil 420 and the second magnet 320 and the third driving portion including the third coil 430 and the third magnet 330, and the Lorentz force is caused to be generated in the "negative (−) direction" in the first driving portion including the first coil 410 and the first magnet 310 and the fourth driving portion including the fourth coil 440 and the fourth magnet 340, an upper right diagonal line may be tilted upward (refer to "c" in FIG. 15), and conversely, a lower left diagonal line may be tilted downward (refer to "d" in FIG. 15). When the Lorentz force is caused to be generated in the "negative (−) direction" in the first driving portion including the first coil 410 and the first magnet 310 and the third driving portion including the third coil 430 and the third magnet 330, and the Lorentz force is caused to be generated in the "positive (+) direction" in the second driving portion including the second coil 420 and the second magnet 320 and the fourth driving portion including the fourth coil 440 and the fourth magnet 340, the lower right diagonal line may be tilted upward (refer to "e" in FIG. 15), and conversely, the upper left diagonal line may be tilted downward (refer to "f" in FIG. 15). Then, when the Lorentz force is caused to be generated in the "negative (−) direction" in the second driving portion including the second coil 420 and the second magnet 320 and the third driving portion including the third coil 430 and the third magnet 330, and the Lorentz force is caused to be generated in the "positive (+) direction" in the first driving portion including the first coil 410 and the first magnet 310 and the fourth driving portion including the fourth coil 440 and the fourth magnet 340, the lower left diagonal line may be tilted upward (refer to "g" in FIG. 15), and conversely, the upper right diagonal line may be tilted downward (refer to "h" in FIG. 15). The positive direction mentioned above may be upward, and the negative direction mentioned above may be downward. In the present embodiment, the tilting driving may be sequentially performed in four directions (upper left, upper right, lower right, and lower left).

In the present embodiment, since the driving portions are applied to four sites, it is possible to control force of each driving portion separately, and thus there is an advantage of facilitating precise control. Meanwhile, since tilting is performed to be horizontally symmetrical, a tilting distance may be shortened.

The camera module may include the housing 100. The housing 100 may be disposed on the PCB 4. The housing 100 may be disposed on an upper portion of the PCB 4. The housing 100 may be disposed on an upper surface of the PCB 4. The housing 100 may accommodate the holder 200 therein. The lens module 10 may be coupled to the housing 100. The housing 100 may be a coil case to which a coil is fixed. A coil 400 and a substrate 500 may be attached to the housing 100. The housing 100 may be coupled to a barrel of the lens module 10. In the housing 100, an outer side portion 120 to which the coil 400 is coupled and an inner side portion 110 to which the lens module 10 is coupled may be integrally formed. Through the above-mentioned integrated structure, the size of the housing 100 and the number of components of the housing 100 may be reduced. The housing 100 may be made of a nonmagnetic material.

The housing 100 may include a base. In a modified example, the camera module may include a base that is separate from the housing 100. Here, the holder 200 may be spaced apart from the base. The base may be spaced apart from the sensor 30.

The housing 100 may include a first corner that corresponds to the first corner of the holder 200, a second corner that corresponds to a second corner of the holder 200, a third corner that corresponds to a third corner of the holder 200, and a fourth corner that corresponds to a fourth corner of the holder 200.

The housing 100 may include the inner side portion 110. The inner side portion 110 may be coupled to the lens module 10. The inner side portion 110 of the housing 100 may include a hole 111. The hole 111 may be a hollow. The hole 111 may pass through the housing 100 in the optical axis direction. Screw threads 112 may be formed on an inner circumferential surface of the inner side portion 110. The screw threads 112 of the housing 100 may be coupled to screw threads of the lens module 10. A curved surface may be disposed on an upper side of the screw threads 112 of the inner circumferential surface of the housing 100. An outer circumferential surface of the lens module 10 may include a curved surface that faces the curved surface of the inner circumferential surface of the housing 100 and is spaced apart therefrom.

The inner side portion 110 of the housing 100 may include a recessed portion 113. The recessed portion 113 may be a recess. The recessed portion 113 may have a curvature that corresponds to a curvature of a protruding portion 221. The recessed portion 113 may be formed to avoid interference with the protruding portion 221 of the holder 200. The housing 100 may include a first surface that is disposed at an inner side of the protruding portion 221 of the holder 200 so as to face the protruding portion 221. The recessed portion 113 having the curvature corresponding to the curvature of the protruding portion 221 may be formed in the first surface of the housing 100. In this way, the first surface of the housing 100 may avoid interference with the protruding portion 221 of the holder 200.

The inner side portion 110 of the housing 100 may include a tapered surface 114. The tapered surface 114 may be formed on a lower end of the inner side portion 110 of the housing 100. In this way, the lower end of the inner side portion 110 of the housing 100 may avoid interference with the holder 200 during movement of the holder 200. The tapered surface 114 of the housing 100 may be disposed to be opposite and parallel to a tapered surface 212 of the holder 200.

The inner side portion 110 of the housing 100 may include a groove 115. The groove 115 may be provided to inform an assembler of the orientation in the process of assembling the housing 100. The groove 115 may be provided as one or more grooves 115 formed in the corners of the housing 100.

The housing 100 may include the outer side portion 120. The coil 400 may be disposed on the outer side portion 120. The outer side portion 120 may be disposed at the outer side of the inner side portion 110. The outer side portion 120 and the inner side portion 110 may be formed as separate members. The outer side portion 120 of the housing 100 may include sidewalls. The sidewalls of the housing 100 may be disposed at the outer side of the holder 200.

The sidewalls of the housing 100 may include first to fourth sidewalls. The housing 100 may include the first and second sidewalls which are disposed opposite to each other and the third and fourth sidewalls which are disposed opposite to each other between the first and second sidewalls.

The outer side portion 120 of the housing 100 may include a hole 121. The hole 121 of the housing 100 may have a shape that corresponds to the shape of the coil 400. The hole 121 may be formed in a shape that is larger than the coil 400. The hole 121 may accommodate the coil 400. The sidewalls of the housing 100 may include the hole 121. The hole 121 may be formed in each of the first to fourth sidewalls.

The outer side portion 120 of the housing 100 may include a groove 122. An end portion of the coil 400 may be disposed in the groove 122. The groove 122 may include a first groove and a second groove. In a modified example, only one of the first groove and the second groove may be formed in the housing 100. Any one or more of the first groove and the second groove may be omitted. The sidewalls of the housing 100 may include the first groove which is formed to be recessed upward from the hole 121 of the sidewall of the housing 100 and the second groove which is formed to be recessed downward from the hole 121 of the sidewall of the housing 100.

The outer side portion 120 of the housing 100 may include a stepped portion. The stepped portion may be formed to protrude from both sides of a terminal portion 520 of the substrate 500 at the sidewalls of the housing 100. The stepped portion may overlap with the substrate 500 in the optical axis direction. The stepped portion may be disposed below a portion of the substrate 500. The stepped portion may include a first step 123 and a second step 124. The first step 123 may be formed to protrude from a corner of an outer surface of the housing 100. The first step 123 may be formed in a shape that corresponds to the substrate 500. The substrate 500 may be disposed on the first step 123. The second step 124 may be formed to protrude from an outer surface of the first step 123. The second step 124 may be formed in a shape that corresponds to a side plate 720 of a cover 700. The side plate 720 of the cover 700 may be disposed on the second step 124.

The outer side portion 120 of the housing 100 may include a first protruding portion 125. The first protruding portion 125 may be formed on the sidewalls of the housing 100 so as to overlap with the substrate 500 in the optical axis direction. The first protruding portion 125 may be disposed on an extending portion 530 of the substrate 500. The first protruding portion 125 may be disposed to correspond to an upper end of the substrate 500 and may prevent the substrate 500 from being detached upward.

The outer side portion 120 of the housing 100 may include a second protruding portion 126. The second protruding portion 126 may be formed on the sidewalls of the housing 100 so as to extend downward from an end portion of the first protruding portion 125 of the sidewalls of the housing 100. The second protruding portion 126 may overlap with the extending portion 530 of the substrate 500 in a direction in which the substrate 500 is disposed. The second protruding portion 126 may overlap with the extending portion 530 of the substrate 500 in a direction perpendicular to the optical axis direction. The second protruding portion 126 may guide the substrate 500 to be disposed at a correct position. The second protruding portion 126 may be disposed only at one side end portion of the first protruding portion 125.

The outer side portion 120 of the housing 100 may include a protrusion 127. The protrusion 127 may be formed on an outer surface of the outer side portion 120 of the housing 100. The protrusion 127 may be inserted into a hole 511 of the substrate 500. The protrusion 127 may include a plurality of protrusions.

The outer side portion 120 of the housing 100 may include a protruding portion 128. The protruding portion 128 may be formed on the corners of the housing 100. The protruding portion 128 may be formed on each of the first sidewall in the vicinity of a corner and the second sidewall in the vicinity of a corner. Both side end portions of the substrate 500 may be disposed on the protruding portions 128.

The outer side portion 120 of the housing 100 may include a protrusion 129. The protrusion 129 may be coupled to a second coupling portion 620 of an elastic member 600. The protrusion 129 may be inserted into a hole of the second coupling portion 620 of the elastic member 600.

The housing 100 may include a connecting portion 130. The connecting portion 130 may connect the inner side portion 110 and the outer side portion 120. The connecting portion 130 may have at least a portion that overlaps with the holder 200 in the optical axis direction. The connecting portion 130 may be disposed on at least a portion of the holder 200.

The connecting portion 130 of the housing 100 may include a hole 131. In the housing 100, the hole 131 may be formed in a first diagonal direction and a third diagonal direction of the filter 20. The hole 131 may be formed so as not to interfere with the holder 200. At least a portion of the holder 200 may pass through the hole 131 of the housing 100. Here, the portion of the holder 200 that passes through the hole 131 may be coupled to the elastic member 600.

The camera module may include the holder 200. The filter 20 may be disposed in the holder 200. The holder 200 may integrally move with the filter 20. The holder 200 may be connected to the elastic member 600. The holder 200 may be spaced apart from the housing 100. A magnet 300 may be disposed in the holder 200. The holder 200 may be a case in which the filter 20 and the magnet 300 are assembled. Since the holder 200 is a portion that is actually driven, there is a need to minimize the weight (size) of the holder 200. In the present embodiment, as illustrated in FIG. 12, an area of an attaching portion 226 of the magnet 300 may be minimized to minimize the size of the holder 200. A nonmagnetic material may be used for the holder 200 to minimize an influence of a magnetic force of the magnet 300 on the holder 200. The holder 200 may be spaced apart from the base of the housing 100. The holder 200 may be coupled to the elastic member 600 in the first diagonal direction of the filter 20 and tilted.

The holder 200 may include a first side surface, a second side surface disposed opposite to the first side surface, and a third side surface and a fourth side surface which are disposed at opposite sides from each other between the first side surface and the second side surface. The holder 200 may include a first corner between the first side surface and the third side surface, a second corner between the second side surface and the third side surface, a third corner between the second side surface and the fourth side surface, and a fourth corner between the fourth side surface and the first side surface. The holder 200 may include a first corner portion between the first side surface and the third side surface, a second corner portion between the second side surface and the third side surface, a third corner portion between the second side surface and the fourth side surface, and a fourth corner portion between the fourth side surface and the first side surface.

The holder 200 may include a lower plate portion 210. The filter 20 may be coupled to the lower plate portion 210. The filter 20 may be adhered to a lower surface of the lower plate portion 210 by an adhesive. The lower plate portion 210 of the holder 200 may include a hole 211. The hole 211 may be a hollow. The hole 211 may pass through the lower plate portion 210 of the holder 200 in the optical axis direction.

The lower plate portion 210 of the holder 200 may include a groove 213. The filter 20 may be disposed in the groove 213. The groove 213 may be formed in a shape that corresponds to the filter 20. At least a portion of the filter 20 may be accommodated in the groove 213.

The lower plate portion 210 of the holder 200 may include a bent groove 214. The bent groove 214 may be formed in the groove 213 of the lower plate portion 210. In this way, the bent groove 214 may serve as a path that allows exiting of a gas which is generated in the hardening process of an adhesive adhering the filter 20 to the holder 200 or an adhesive disposed on other portions inside the camera module.

The lower plate portion 210 of the holder 200 may include the tapered surface 212. The tapered surface 212 may be formed on a portion of the holder 200 to avoid interference with the housing 100 during movement of the holder 200.

The holder 200 may include sidewalls 220. The sidewalls 220 may extend upward from the lower plate portion 210. The magnet 300 may be fixed to the sidewalls 220.

The sidewalls 220 of the holder 200 may include the protruding portion 221. The protruding portion 221 may be formed on an upper surface of the holder 200. The protruding portion 221 may pass through the hole 131 of the housing 100. The protruding portion 221 may be disposed in the hole 131 of the housing 100. The protruding portion 221 may be coupled to a first coupling portion 610 of the elastic member 600.

The sidewalls 220 of the holder 200 may include a protrusion 222. The protrusion 222 may be formed on an upper surface of the protruding portion 221. The protrusion 222 may be coupled to the first coupling portion 610 of the elastic member 600. The protrusion 222 may be inserted into a hole of the first coupling portion 610 of the elastic member 600.

The sidewalls 220 of the holder 200 may include a groove 223. The groove 223 may be formed around the protruding portion 221 on the upper surface of the holder 200. In this way, the holder 200 may avoid interference with the housing 100 during movement of the holder 200. The protruding portion 221 coupled to the elastic member 600 may be present on a corner of the holder 200, and the groove 223 for avoiding interference with the housing 100 may be further formed around the protruding portion 221. The groove 223 may be formed beside the protruding portion 221. The groove 223 may be formed beside both ends of the protruding portion 221. The groove 223 may be formed in an upper surface of the sidewall 220 of the holder 200. The groove 223 may be a recess.

The sidewalls 220 of the holder 200 may include a hole 224. The hole 224 may be formed at the central portion of the attaching portion 226. That is, the attaching portions 226 may be disposed to be spaced apart from each other. In this way, the size of the camera module may be minimized in the horizontal direction. That is, since a space may be secured through the hole 224 formed at the central portion of the attaching portion 226, interference with the housing 100 may be prevented, and the size of the holder 200 may be minimized in the horizontal direction.

The sidewalls 220 of the holder 200 may include a step 225. The step 225 may support an inner surface of the magnet 300. The inner surface of the magnet 300 may be disposed on a stepped surface of the step 225. The sidewalls 220 of the holder 200 may include the attaching portion 226. The attaching portion 226 may include the step 225. The magnet 300 may be adhered to the attaching portion 226 by an adhesive. The attaching portion 226 may fix the magnet 300.

The sidewalls 220 of the holder 200 may include a groove 227. The groove 227 may be formed in a lower end portion of an outer surface of a corner of the sidewall 220 of the holder 200. The groove 227 may be formed to prevent a lower end of a corner of the sidewall 220 of the holder 200 from interfering with the housing 100 in a process in which the holder 200 is tilted in a diagonal direction.

The sidewalls 220 of the holder 200 may include a groove 228. The groove 228 may be formed on the groove 223 formed around the protruding portion 221. Here, the groove 223 may be referred to as "first groove" or "recess," and the groove 228 may be referred to as "second groove." The groove 228 may be provided to inform an assembler of the orientation in the process of assembling the holder 200. The groove 228 may be provided as one or more grooves 228 formed in the corners of the holder 200.

The camera module may include the magnet 300. The magnet 300 may be disposed in the holder 200. The magnet 300 may be disposed on an outer circumferential surface of the holder 200. The magnet 300 may protrude past the outer surface of the holder 200. The magnet 300 may face the coil 400. The magnet 300 may electromagnetically interact with the coil 400. The magnet 300 may be disposed on the sidewalls 220 of the holder 200. Here, the magnet 300 may be a flat plate magnet having a flat plate shape. In a modified example, the magnet 300 may be disposed on a corner portion between the sidewalls 220 of the holder 200. Here, the magnet 300 may be a corner magnet having a hexahedral shape in which a side surface of an inner side is larger than a side surface of an outer side.

In the present embodiment, the filter 20 may be tilted due to the Lorentz force that acts on the magnet 300 and the coil 400 in which current flows. In order to cause the Lorentz force to be generated, an actuator may be mainly divided into a magnet portion and a coil portion. A portion that actually operates when the Lorentz force is generated may be the magnet 300. However, in a modified example, the coil 400 may move due to the Lorentz force. In order to drive the coil 400 in the vertical direction, the magnet 300 may be magnetized in a bipolar manner as illustrated in FIG. 14B. That is, the magnet 300 may have a form in which two bipolar magnets are stacked.

The magnet 300 may include a plurality of magnets. The magnet 300 may include four magnets. The magnet 300 may include first to fourth magnets 310, 320, 330, and 340. The magnet 300 may include the first magnet 310, the second magnet 320 which is disposed opposite to the first magnet 310, the third magnet 330, and the fourth magnet which is disposed opposite to the third magnet 330. The first magnet 310 may be disposed on the first side surface of the holder 200, the second magnet 320 may be disposed on the second side surface of the holder 200, the third magnet 330 may be disposed on the third side surface of the holder 200, and the fourth magnet 340 may be disposed on the fourth side surface of the holder 200.

The camera module may include the coil 400. The coil 400 may face the magnet 300. The coil 400 may be disposed to face the magnet 300. The coil 400 may electromagnetically interact with the magnet 300. In this case, when current is supplied to the coil 400 and an electromagnetic field is formed around the coil 400, the magnet 300 may move relative to the coil 400 due to the electromagnetic interaction between the coil 400 and the magnet 300. The coil 400 may be coupled to an inner surface of the substrate 500. The coil 400 may be disposed in the hole 121 of the sidewall of the housing 100. The coil 400 and the magnet 300 may be disposed at opposite positions from each other.

The coil 400 may include a pair of end portions (leader lines) for power supply. Here, a first end portion 401 of the coil 400 may be withdrawn to the top of the coil 400, and a second end portion 402 of the coil 400 may be withdrawn to the bottom of the coil 400. The coil 400 may include the first end portion 401 and the second end portion 402 which are coupled to the substrate 500. As illustrated in FIG. 11A, the first and second end portions 401 and 402 of the coil 400 may be coupled to a terminal 512 of the substrate 500. Here, the first and second end portions 401 and 402 of the coil 400 may be soldered to the terminal 512 of the substrate 500 or coupled thereto using silver (Ag) epoxy. That is, the coil 400 may be coupled to the substrate 500 by manual soldering. Meanwhile, in a modified example, as illustrated in FIG. 11B, the first and second end portions 401 and 402 of the coil 400 may be coupled to the terminal 512 of the substrate 500 through a separate coupling member 405. The coupling member 405 may be a coil support. The coil 400 may be surface-mounted (SMT) on the substrate 500 by applying the coupling member 405. In this case, there is an advantage in that the assembly convenience is improved by enhancing workability of manual soldering and shortening work time of manual soldering, and there is an advantage in that the positional tolerance of the coil 400 due to assembling is reduced relative to manual soldering. In this way, misalignment of the centers of the coil 400 and the magnet 300 may be prevented. The first end portion 401 of the coil 400 may be disposed in the first groove of the housing 100, and the second end portion 402 of the coil 400 may be disposed in the second groove of the housing 100. Here, a current-carrying material and/or the coupling member 405 connected to the first and second end portions 401 and 402 may also be disposed in the groove 122 of the housing 100.

As illustrated in FIG. 14C, current that generates the Lorentz force may flow in one direction (refer to "a" in FIG. 14C) in the coil 400. Current may flow in a forward direction in the coil 400. Meanwhile, current may flow in the other direction, which is opposite to the one direction, in the coil 400. That is, current may flow in a reverse direction in the coil 400. As illustrated in FIG. 14, an N-pole may be disposed in an outer side region of an upper surface of the magnet 300 and current may be caused to flow in one direction in the coil 400 so that an upward driving direction (refer to "c" in FIG. 14A) may act on the coil 400 due to the Lorentz force.

The coil 400 may include a plurality of coils. The coil 400 may include four coils. The coil 400 may include first to fourth coils 410, 420, 430, and 440. Current may be independently applied to each of the first to fourth coils 410, 420, 430, and 440. Current may be separately applied to each of the first to fourth coils 410, 420, 430, and 440. The first to fourth coils 410, 420, 430, and 440 may be electrically separated. The coil 400 may include a first coil 410 facing the first magnet 310, a second coil 420 facing the second magnet 320, a third coil 430 facing the third magnet 330, and a fourth coil 440 facing the fourth magnet 340. The first to fourth coils 410, 420, 430, and 440 may be coupled to the housing 100. The coil 400 may include a first coil 410 disposed in the hole 121 of the first sidewall of the housing 100, a second coil 420 disposed in the hole 121 of the second sidewall of the housing 100, a third coil 430 disposed in the hole 121 of the third sidewall of the housing 100, and a fourth coil 440 disposed in the hole 121 of the fourth sidewall of the housing 100.

In the present embodiment, the four coils may be controlled in two channels. The first coil 410 and the second coil 420 may be electrically connected. However, a direction of the Lorentz force generated between the first coil 410 and the first magnet 310 may be the opposite to a direction of the Lorentz force generated between the second coil 420 and the second magnet 320. For example, the first coil 410 and the second coil 420 may be disposed so that current flows therein in opposite directions. Alternatively, the first coil 410 and the second coil 420 may be disposed to be wound in opposite directions. Alternatively, the first coil 410 and the second coil 420 may be disposed to be wound in the same direction, and polarity arrangement of the first magnet 310 and polarity arrangement of the second magnet 320 may be in different directions. Meanwhile, the first coil 410 and the second coil 420 may be electrically separated and integrally controlled by a controller.

The third coil 430 and the fourth coil 440 may be electrically connected. However, a direction of the Lorentz force generated between the third coil 430 and the third magnet 330 may be the opposite to a direction of the Lorentz force generated between the fourth coil 440 and the fourth magnet 340. The third coil 430 and the fourth coil 440 may be disposed so that current flows therein in opposite directions. For example, the third coil 430 and the fourth coil 440 may be disposed to be wound in opposite directions. Alternatively, the third coil 430 and the fourth coil 440 may be disposed to be wound in the same direction, and polarity arrangement of the third magnet 330 and polarity arrangement of the fourth magnet 340 may be in different directions. Meanwhile, the third coil 430 and the fourth coil 440 may be electrically separated and integrally controlled by a controller.

The camera module may include a sensor 450. The sensor 450 may be used for feedback control. The sensor 450 may include a Hall sensor or a Hall integrated chip (IC). The sensor 450 may detect the magnet 300. The sensor 450 may detect a magnetic force of the magnet 300. The sensor 450 may be disposed between the coils 400. The sensor 450 may be disposed on an inner surface of the substrate 500.

The sensor 450 may include a plurality of sensors. The sensor 450 may include two sensors. The sensor 450 may include first and second sensors 451 and 452. The first sensor 451 and the second sensor 452 may be disposed so that directions in which the first sensor 451 and the second sensor 452 face are perpendicular to each other. In this way, the first sensor 451 and the second sensor 452 may detect both movement of the magnet 300 along the x-axis and movement of the magnet 300 along the y-axis in the horizontal direction. In the present embodiment, an additional sensor may be further provided to detect movement of the magnet 300 along the z-axis (in the vertical direction or optical axis direction).

The camera module may include the substrate 500. The substrate 500 may be a FPCB. The substrate 500 may be disposed in the housing 100. The substrate 500 may be disposed on an outer surface of a sidewall of the housing 100. The substrate 500 may be disposed between the side plate 720 of the cover 700 and the sidewall of the housing 100. The substrate 500 may have a shape that matches the shapes of the first step 123, the first protruding portion 125, the second protruding portion 126, the protrusion 127, and the protruding portion 128 of the housing 100. The substrate 500 may be disposed to surround outer surfaces of the four sidewalls of the housing 100. In the present embodiment, a position control guide may be applied between the substrate 500 and the housing 100 to prevent the position of the coil 400 from being changed to an incorrect position.

The substrate 500 may be connected to the PCB 4, which is a main substrate, to be able to transmit a signal to the coil 400 after the coil 400 is assembled. The substrate 500 may be fixed to the housing 100, which is a coil case, to allow the coil 400 to be stably fixed to the substrate 500. The sensor 450 configured to sense the position of the magnet 300 may also be coupled to the substrate 500. The substrate 500 may be a FPCB. The sensor 450 and the coil 400 may be surface-mounted (SMT) on the substrate 500. In the present embodiment, since the sensor 450 is coupled to the substrate 500, a separate component for carrying current to the sensor 450 may not be required. In the present embodiment, the substrate 500 may be disposed at an outer side of the housing 100 to allow soldering of the terminal portion 520 of the substrate 500 and the PCB 4, and thus a space required for connection may be minimized.

The substrate 500 may include first to fourth portions 501, 502, 503, and 504. The substrate 500 may include a first portion 501 disposed on the first sidewall of the housing 100, a second portion 502 disposed on the second sidewall of the housing 100, a third portion 503 disposed on the third sidewall of the housing 100, and a fourth portion 504 disposed on the fourth sidewall of the housing 100. The third portion 503 of the substrate 500 may connect the first portion 501 of the substrate 500 and the second portion 502 of the substrate 500, the second portion 502 of the substrate 500 may connect the third portion 503 of the substrate 500 and the fourth portion 504 of the substrate 500, and the first portion 501 and the fourth portion 504 of the substrate 500 may be spaced apart from each other. An end portion of the first portion 501 of the substrate 500 and an end portion of the fourth portion 504 of the substrate 500 may be disposed at the protruding portion 128 which is formed to protrude from a corner where the first sidewall and the fourth sidewall of the housing 100 meet.

The substrate 500 may include a body portion 510. The coil 400 may be coupled to the body portion 510. The sensor 450 may be coupled to the body portion 510. The body portion 510 may be disposed on an outer surface of the housing 100. The body portion 510 of the substrate 500 may include a hole 711. The hole 711 may be coupled to the protrusion 127 of the housing 100.

The substrate 500 may include the terminal portion 520. The terminal portion 520 may extend downward from the body portion 510 and include a plurality of terminals. The terminal portion 520 may be coupled to the PCB 4 by soldering. The terminal portion 520 may be formed on a lower end of the substrate 500. The terminal portion 520 may be disposed between the stepped portions of the housing 100.

The substrate 500 may include the extending portion 530. The extending portion 530 may extend upward from the body portion 510. The extending portion 530 may form an upper end portion of the substrate 500. The extending portion 530 may be formed in the shape and size that correspond to the first protruding portion 125 and the second protruding portion 126 of the housing 100. In a modified example, in the substrate 500, the extending portion 530 may be omitted, and the first protruding portion 125 may be disposed on the body portion 510.

The camera module may include the elastic member 600. The elastic member 600 may be connected to the housing 100. The elastic member 600 may connect the holder 200 and the housing 100. The elastic member 600 may have elasticity. The elastic member 600 may include a portion having elasticity. The elastic member 600 may include a leaf spring. The elastic member 600 may be made of a metal material.

The elastic member 600 may connect the housing 100 and the magnet portion including the magnet 300 and connect the holder 200 and the coil portion including the coil 400. The elastic member 600 may serve to control driving of the coil portion. As illustrated in FIGS. 16 to 18, the elastic member 600 may be assembled to the protrusion 129 of the housing 100 and the protrusion 222 of the protruding portion 221 of the holder 200 and then fixed by bonding. In the present embodiment, the assembly structure of the elastic member 600 may be relatively simple because the elastic member 600 is assembled and fixed outside the housing 100 and the holder 200. In the present embodiment, the elastic member 600 may have a structure that allows the position of a spring to have a degree of freedom in the vertical direction. The elastic member 600 may be disposed only on the upper side, disposed on both the upper and lower sides, or disposed only on the lower side according to embodiments.

The elastic member 600 may include the first coupling portion 610. The first coupling portion 610 of the elastic member 600 may be coupled to a corner of the holder 200.

The first coupling portion 610 of the elastic member 600 may include two first coupling portions. The two first coupling portions may be disposed to be symmetrical with respect to the optical axis in the first diagonal direction of the filter 20. The two first coupling portions may be disposed at opposite sides from each other with respect to the optical axis. The first coupling portion 610 of the elastic member 600 may be coupled to each of the first corner of the holder 200 and the third corner of the holder 200.

The elastic member 600 may include the second coupling portion 620. The second coupling portion 620 of the elastic member 600 may be coupled to a corner of the housing 100 that corresponds to a corner of the holder 200 which is adjacent to another corner of the holder 200 to which the first coupling portion 610 is coupled. The second coupling portion 620 of the elastic member 600 may include two second coupling portions. The two second coupling portions may be disposed to be symmetrical with respect to the optical axis in the second diagonal direction of the filter 20 which is different from the first diagonal direction of the filter 20. The two second coupling portions may be disposed at opposite sides from each other with respect to the optical axis. The second coupling portion 620 of the elastic member 600 may be coupled to each of the second corner of the housing 100 and the fourth corner of the housing 100.

The elastic member 600 may include a connecting portion 630. The connecting portion 630 may connect the first coupling portion 610 and the second coupling portion 620. The connecting portion 630 may elastically connect the first coupling portion 610 and the second coupling portion 620. The connecting portion 630 may have elasticity. The connecting portion 630 may include a bent portion.

The elastic member 600 may be an upper elastic member which is coupled to an upper portion of the housing 100 and an upper portion of the holder 200. Here, the upper elastic member may be referred to as "first elastic member" or "second elastic member." The upper elastic member may include a first coupling portion 610 coupled to the upper portion of the holder 200, a second coupling portion 620 coupled to the upper portion of the housing 100, and a connecting portion 630 configured to connect the first coupling portion 610 and the second coupling portion 620.

The elastic member 600 may be formed in various shapes to allow an optimal shape and an optimal stiffness to be found.

In the present embodiment, as illustrated in FIG. 16, the connecting portion 630 of the elastic member 600 may be formed in a straight shape. However, the connecting portion 630 may be formed to be round at points where the connecting portion 630 meets the first coupling portion 610 and the second coupling portion 620.

In a modified example, as illustrated in FIG. 17, a connecting portion 630 of an elastic member 600-1 may include a plurality of bent portions 631. However, the bent portion 631 may be a portion formed in a zigzag shape instead of a portion formed by folding. The connecting portion 630 of the elastic member 600-1 may include a bent portion or a round portion. In a modified example, the plurality of bent portions 631 may be continuously formed in the longitudinal direction of the connecting portion 630.

In another modified example, as illustrated in FIG. 18, a connecting portion 630 of an elastic member 600-2 may include a first bent portion 632 and a second bent portion 633. Unlike the previous modified example in which the bent portions 631 are continuously formed, the first bent portion 632 and the second bent portion 633 may be formed so as not to be continuous.

In still another modified example, as illustrated in FIG. 19, the camera module may include a lower elastic member 600-3. The lower elastic member 600-3 may be referred to as "first elastic member" or "second elastic member." The lower elastic member 600-3 may be coupled to a lower portion of the housing 100 and a lower portion of the holder 200. The lower elastic member 600-3 may include a first coupling portion 610 coupled to the lower portion of the holder 200, a second coupling portion 620 coupled to the lower portion of the housing 100, and a connecting portion 630 configured to connect the first coupling portion 610 and the second coupling portion 620. The connecting portion 630 of the lower elastic member 600-3 may include a first bent portion 634 and a second bent portion 635. Here, as illustrated in FIG. 19, the first bent portion 634 and the second bent portion 635 may be formed so as not to be continuous. However, in a modified example, the connecting portion 630 of the lower elastic member 600-3 may include continuous bent portions like the elastic member 600-1 of FIG. 17. Alternatively, in another modified example, the connecting portion 630 of the lower elastic member 600-3 may be formed as a straight portion without a bent portion like the elastic member 600 of FIG. 16.

The first coupling portion 610 of the lower elastic member 600-3 may be coupled to another corner of the holder 200 (a corner different from the corner to which the first coupling portion 610 of the upper elastic member is coupled). The first coupling portion 610 of the lower elastic member 600-3 may be coupled to a first protruding portion 221-1 disposed at the first corner of the holder 200, and the second coupling portion 620 of the lower elastic member 600-3 may be coupled to a second protrusion 129-1 disposed at the second corner of the housing 100.

In the present embodiment, the upper elastic member may be coupled to the housing 100 in the first diagonal direction of the filter 20 and may be coupled to the holder 200 in the second diagonal direction of the filter 20. Here, the lower elastic member 600-3 may be coupled to the housing 100 in the second diagonal direction of the filter 20 and may be coupled to the holder 200 in the first diagonal direction of the filter 20. That is, a diagonal direction in which a portion, to which the upper elastic member is coupled, is connected may be different from a diagonal direction in which a portion, to which the lower elastic member is coupled, is connected. In this way, tilting may be prevented in an initial state of the holder 200, and control in all of the four diagonal directions may be performed using the same current.

Meanwhile, in the modified examples illustrated in FIGS. 17 to 19, the shape of the substrate 500 may be different as compared to the present embodiment illustrated in FIG. 16.

The camera module may include the cover 700. The cover 700 may be a bracket. The cover 700 may include a "cover can." The cover 700 may be disposed to surround the housing 100. The cover 700 may be coupled to the housing 100. The cover 700 may accommodate the housing 100 therein. The cover 700 may form an exterior of the camera module. The cover 700 may have a hexahedral shape with an open lower surface. The cover 700 may be a nonmagnetic body. The cover 700 may be formed of metal. The cover 700 may be formed of a metallic plate material. The cover 700 may be connected to a ground portion of the PCB 4. In this way, the cover 700 may be grounded. The cover 700 may block electromagnetic interference (EMI). Here, the cover 700 may be referred to as "EMI shield can." The cover 700 is a finally assembled component and may protect the product from external impact. The cover 700 may be made of a material having a small thickness and a high stiffness.

The cover 700 may include an upper plate 710 and a side plate 720. The cover 700 may include an upper plate 710 including a hole 711 and a side plate 720 which extends downward from an outer periphery or an edge of the upper plate 710. A lower end of the side plate 720 of the cover 700 may be disposed on the second step 124 of the housing 100. An inner surface of the side plate 720 of the cover 700 may be fixed to the housing 100 by an adhesive. The upper plate 710 of the cover 700 may include the hole 711 which corresponds to the hole 211 of the holder 200.

The cover 700 may serve to support the substrate 500 and the coil 400 so that the substrate 500 and the coil 400 are not pushed by the Lorentz force. The cover 700 may serve to dissipate heat generated from the coil 400 through conduction. The side plate 720 of the cover 700 may include a bent portion 721 which is formed by a portion of the side plate 720 of the cover 700 being bent inward and which comes in contact with an outer surface of the substrate 500. The bent portion 721 may include any one or more of a pressing portion, a press-fitting portion, and a concave portion. In the present embodiment, the coil 400, the substrate 500, and the cover 700, which is made of a metal material, may be connected through a substrate 500 contact structure of the bent portion 721, which is a structure optimized for heat dissipation, and thus heat generated from the coil 400 may be dissipated to the outside through conduction (refer to "a" of FIG. 21B). Compared with a comparative example shown in FIG. 22A, it can be seen that an internal temperature of the camera module is lowered in the present embodiment shown in FIG. 22B. In particular, temperature of a portion, whose temperature is measured as 46.9° C. in the comparative example, is measured as 41.4° C. in the present embodiment, and thus it can be seen that the present embodiment has an effect of decreasing the temperature by about 10%.

The side plate 720 of the cover 700 may include a plurality of side plates. The plurality of side plates may include first to fourth side plates. The side plate 720 of the cover 700 may include a first side plate and a second side plate which are disposed at opposite sides from each other and a third side plate and a fourth side plate which are disposed at opposite sides from each other between the first side plate and the second side plate.

In the present embodiment, a stiffness of the elastic member 600 may be in a range of 53 mN/mm to 80 mN/mm. Here, the stiffness of the elastic member 600 may be a stiffness of the connecting portion 630 of the elastic member 600. In a case in which the stiffness of the elastic member 600 is less than 53 mN/mm, a problem occurs in that a tilting angle is larger than a target tilting angle even when a level of current is lowered when referring to a measured value of an analyzing step, and 80 mN/mm may be the largest value in a limited space of the present embodiment. This may also apply to the elastic members 600-1 and 600-2 and the lower elastic member 600-3 according to the modified examples of the present embodiment.

In the present embodiment, the level of current applied to the coil 400 may be in a range of 18 mA to 22 mA. In a case in which the current applied to the coil 400 is less than 18 mA, there is a problem in that a tilting angle is small when the stiffness of the elastic member 600 is 53 mN/mm during a test in the analyzing step, and in a case in which the current applied to the coil 400 exceeds 22 mA, it is problematic because a large amount of current is consumed and heat may be generated from the coil.

FIG. 23 is a view for describing a tilting portion according to the present embodiment.

As illustrated in FIG. 23, the camera module may include a tilting portion 800 that is able to three-dimensionally tilt the filter. As described above, the tilting portion 800 may tilt the filter so that an optical path of an input light signal that passes through the filter repeatedly moves according to a predetermined rule.

The predetermined rule may include a first tilt sequence, a second tilt sequence, a third tilt sequence, and a fourth tilt sequence. The first to fourth tilt sequences may allow the optical path of the input light signal that passes through the filter to be disposed at different positions. The first to fourth tilt sequences may allow the optical path of the input light signal that passes through the filter to move in different diagonal directions.

The tilting portion 800 may, according to the first tilt sequence, tilt the filter so that the optical path of the input light signal that passes through the filter moves in a direction toward an upper end of a left side of the sensor. The tilting portion 800 may, according to the second tilt sequence, tilt the filter so that the optical path of the input light signal that passes through the filter moves in a direction toward an upper end of a right side of the sensor. The tilting portion 800 may, according to the third tilt sequence, tilt the filter so that the optical path of the input light signal that passes through the filter moves in a direction toward a lower end of the right side of the sensor. The tilting portion 800 may, according to the fourth tilt sequence, tilt the filter so that the optical path of the input light signal that passes through the filter moves in a direction toward a lower end of the left side of the sensor.

The tilting portion 800 may, according to the first tilt sequence, tilt the filter so that a line segment which consists of a vertex at an upper end of a left side of the filter and the central point of the filter forms a positive tilting angle with a reference surface which is a surface of an IR filter before tilting and a line segment which consists of a vertex at a lower end of a right side of the filter and the central point of the filter forms a negative tilting angle with the reference surface. The tilting portion 800 may, according to the second tilt sequence, tilt the filter so that a line segment which consists of a vertex at an upper end of a right side of the filter and the central point of the filter forms a positive tilting angle with a reference surface which is a surface of an IR filter before tilting and a line segment which consists of a vertex at a lower end of a left side of the filter and the central point of the filter forms a negative tilting angle with the reference surface. The tilting portion 800 may, according to the third tilt sequence, tilt the filter so that the line segment consisting of the vertex at the lower end of the right side of the filter and the central point of the filter forms a positive tilting angle with a reference surface which is a surface of an IR filter before tilting and the line segment consisting of the vertex at the upper end of the left side of the filter and the central point of the filter forms a negative tilting angle with the reference surface. The tilting portion 800 may, according to the fourth tilt sequence, tilt the filter so that the line segment consisting of the vertex at the lower end of the left side of the filter and the central point of the filter forms a positive tilting angle with a reference surface which is a surface of an IR filter before tilting and the line segment consisting of the vertex at the upper end of the right side of the filter and the central point of the filter forms a negative tilting angle with the reference surface.

The tilting portion 800 may tilt the filter so that any one combination in which the first to fourth tilt sequences are sequentially performed is repeated. For example, the tilting portion 800 may tilt the filter by repeating a predetermined rule having an order of [first tilt sequence→second tilt sequence→third tilt sequence→fourth tilt sequence]. As another example, the tilting portion 800 may tilt the filter by repeating a predetermined rule having an order of [second tilt sequence→third tilt sequence→fourth tilt sequence→first tilt sequence]. As another example, the tilting portion 800 may tilt the filter by repeating a predetermined rule having an order of [first tilt sequence→third tilt sequence→second tilt sequence→fourth tilt sequence].

In order to implement the above function, the tilting portion 800 may include a tilting driver 820 and a tilting actuator 830 and may further include a tilting controller 810.

The tilting controller 810 may generate a control signal for controlling driving of the tilting driver 820. The tilting controller 810 may be a microcontroller unit (MCU) which is able to generate the control signal but is not limited thereto. The tilting controller 810 may input the generated control signal to the tilting driver 820. The tilting controller 810 may transmit and receive a control signal to and from the tilting driver 820 through an inter-integrated circuit (I2C) communication method. For example, in the I2C communication, the tilting controller 810 may be a master-mode device, and the tilting driver 820 may be a slave-mode device. The master-mode tilting controller 810 may transmit a control signal to the slave-mode tilting driver 820. To this end, the tilting controller 810 may be connected to each of a serial clock (SCL) communication line and a serial data (SDA) communication line. The tilting controller 810 communicating with the tilting driver 820 through the I2C communication is only an example, and the present invention is not limited thereto.

The tilting controller 810 may control the on/off of the tilting driver 820 through a control signal. That is, the control signal may include information that allows an operation start and an operation pause of the tilting driver 820 to be controlled. The tilting controller 810 may control a voltage level of an output signal of the tilting driver 820 through a control signal. That is, the control signal may include information that allows a voltage size of the output signal of the tilting driver 820 to be controlled. The tilting controller 810 may control a delay time through a control signal. That is, the control signal may include information relating to control of the delay time. Here, the delay time may refer to an interval between a point in time at which a specific waveform of a trigger signal is generated and a point in time at which a specific waveform of an output signal is generated. The tilting controller 810 may control a frame time through a control signal. That is, the control signal may include information relating to control of the frame time. Here, the frame time may refer to the time taken for the camera device to generate a single image frame and may also be a cycle in which a specific waveform is generated in a trigger signal.

Meanwhile, the tilting controller 810 may be disposed outside the camera module as illustrated in FIG. 23A. For example, in a case in which the camera module is installed in a mobile terminal, the tilting controller 810 may be disposed in the mobile terminal. In this case, the tilting portion 800 included in the camera module may be configured to include the tilting driver 820 and the tilting actuator 830. In another embodiment, the tilting controller 810 may be included in the tilting portion 800 as illustrated in FIG. 23B. For example, the tilting controller 810 may be disposed in one space of the camera module. In this case, the tilting portion 800 included in the camera module may be configured to include the tilting driver 820, the tilting actuator 830, and the tilting controller 810.

The tilting driver 820 may generate an output signal synchronized with an integration time of a sensor on the basis of a trigger signal received from the sensor.

The tilting driver 820 may receive a voltage from the camera module. The tilting driver 820 may receive a first voltage and a second voltage which are branched from a voltage supplied from the camera module. The tilting portion 800 may further include an inductor to branch a voltage input from a power source of the camera module into a first voltage and a second voltage. Each of the branched first voltage and second voltage may be input to the tilting driver 820. The first voltage may be a voltage used in driving of the tilting driver 820, and the second voltage may be a voltage used in driving of the tilting actuator 830. The first voltage and the second voltage may have the same voltage size and may be a 3.3 V DC voltage but are not limited thereto. The tilting driver 820 may include a first power input terminal configured to receive the first voltage and a second power input terminal configured to receive the second voltage.

The tilting driver 820 may receive a trigger signal. The trigger signal may be output from a sensor, that is, an image sensor. The trigger signal may be a square-wave signal having a predetermined cycle. The tilting driver 820 may use a trigger signal in synchronizing a driving cycle of the tilting actuator 830 and a driving cycle of the sensor. The tilting driver 820 may include a terminal configured to receive a trigger signal.

The tilting driver 820 may receive a control signal from the tilting controller 810. The tilting driver 820 may include a communication connection terminal for communication connection with the tilting controller 810. In a case in which the I2C communication method is used, the communication connection terminal may consist of two terminals.

The tilting driver 820 generates an output signal on the basis of the voltage and trigger signal received from the camera module and the control signal received from the tilting controller 810. Detailed description on the generation of the output signal will be given below with reference to the drawings.

The tilting driver 820 may output an output signal to the tilting actuator 830. The output signal is a signal that consists of two channels and may include a first output signal and a second output signal. Therefore, the tilting driver 820 may include a first output terminal for outputting the first output signal and a second output terminal for outputting the second output signal, and each terminal may be connected to the tilting actuator 830 through a signal line.

The tilting actuator 830 may tilt the filter in a diagonal direction through the output signal. The tilting actuator 830 may include first to fourth driving portions, and each driving portion may include a single coil and a single magnet. The first output signal may be input to the first driving portion and the third driving portion. Specifically, the first output signal may be input to a first coil of the first driving portion and a third coil of the third driving portion. The second output signal may be input to the second driving portion and the fourth driving portion. Specifically, the second output signal may be input to a second coil of the second driving portion and a fourth coil of the fourth driving portion. That is, the tilting actuator 830 may tilt the filter 20 in a diagonal direction through the output signal including the first output signal and the second output signal.

FIG. 24 is a view for describing the tilting actuator in detail.

FIG. 24A illustrates a form in which the first to fourth coils of the tilting actuator 830 are disposed on the substrate 500. The first to fourth coils may be disposed on the substrate 500 while being spaced apart from each other at a predetermined distance. The substrate 500 may be implemented in a form in which a portion between the first coil and the second coil, a portion between the second coil and the third coil, and a portion between the third coil and the fourth coil are foldable.

The coils facing each other among the first to fourth coils may be formed in an antiparallel structure in which directions of current flowing in the coils are opposite to each other. That is, the first coil and the third coil may constitute a single antiparallel structure, and the second coil and the fourth coil may constitute a single antiparallel structure. Since the first coil and the third coil constitute a single antiparallel structure, current $I_1$ flowing in the first coil and current $I_3$ flowing in the third coil may have an antiparallel relationship ($I_1=-I_3$). Since the second coil and the fourth coil constitute a single antiparallel structure, current $I_2$ flowing in the second coil and current $I_4$ flowing in the fourth coil may have an antiparallel relationship ($I_2=-I_4$).

FIG. 24B illustrates the PCB 4 on which the substrate having the first to fourth coils disposed thereon is disposed. A pad in which the tilting actuator 830 is embedded may be disposed on a portion of the PCB 4 where the light receiving portion is disposed. The pad may include a first pad and a second pad disposed at a position facing the first pad.

FIG. 24C illustrates a form in which the substrate having the first to fourth coils disposed thereon, which is illustrated in FIG. 24A, is coupled to the PCB 4. The substrate having the first to fourth coils disposed thereon, which is illustrated in FIG. 24A, may have a quadrilateral shape that is folded at predetermined intervals and predetermined angles. The substrate having the first to fourth coils disposed thereon that has the quadrilateral shape may be coupled to an upper portion of the PCB 4. The first pad and the second pad disposed on the PCB 4 may be coupled to portions of the substrate where the first coil and the second coil are disposed. Here, the substrate and the PCB 4 may be coupled by soldering the first pad and second pad portions. The first to fourth magnets may be disposed to correspond to the first to fourth coils, respectively. A first output signal X may be input to the first coil and the third coil. A second output signal Y may be input to the second coil and the fourth coil.

FIG. 25 is a view for describing a driving sequence of the tilting portion.

FIG. 25 illustrates a first output signal and a second output signal which are generated according to a trigger signal. The first output signal may be input to the first coil and the third coil, and the second output signal may be input to the second coil and the fourth coil.

As illustrated in FIG. 25, the trigger signal may be a square-wave signal in which a pulse is generated at a predetermined cycle. A pulse interval, that is, a pulse cycle, of the trigger signal may be a single image frame interval. An interval from a rising edge of a pulse of the trigger signal to a rising edge of the next pulse may be a single image frame interval. The pulse width of the trigger signal may be set to be smaller than a single image frame interval.

In a state before a driving sequence of the tilting actuator 830 is started, that is, in a default state, a level of current of the first output signal and the second output signal may be level 0. Here, level 0 may refer to a current of 0 [A] but is not limited thereto.

When a driving sequence of the tilting actuator 830 is started, the level of current of the first output signal and the second output signal is controlled after a set delay time elapses with respect to a falling edge of a pulse of the trigger signal. The level of current of the first output signal and the second output signal may be controlled for each frame width. The first output signal and the second output signal may be controlled to have a high-level current or a low-level current in each frame width. The high-level current may refer to a state of having a current value higher than a reference-level current, and the low-level current may refer to a state of having a current value lower than the reference-level current. For example, in a case in which the reference current level is set as 0 [A], the high level may refer to current having a positive (+) value, and the low level may refer to current having a negative (−) value. In a case in which levels of current of output signals differ in consecutive steps, a predetermined amount of time may be required to increase or decrease the level of current.

Table 1 below shows the first output signal and the second output signal illustrated in FIG. 25.

TABLE 1

| STEP | First output signal X | Second output signal Y |
|------|-----------------------|------------------------|
| 1    | (−)                   | (+)                    |
| 2    | (+)                   | (+)                    |
| 3    | (+)                   | (−)                    |
| 4    | (−)                   | (−)                    |

In Table 1, "(−)" refers to the low-level current, and "(+)" refers to the high-level current. "STEP 1" refers to the first tilt sequence, "STEP 2" refers to the second tilt sequence, "STEP 3" refers to the third tilt sequence, and "STEP 4" refers to the fourth tilt sequence. When a driving sequence of the tilting actuator 830 is started, after a set delay time elapses from a falling edge of a first pulse, the level of current of the first output signal and the second output signal may be controlled (STEP 1). The first output signal may be controlled to reach the low-level current from the reference-level current. The second output signal may be controlled to reach the high-level current from the reference-level current. That is, in STEP 1, the first output signal may be controlled to have the low-level current, and the second output signal may be controlled to have the high-level current.

After the set delay time elapses from a falling edge of a second pulse, the level of current of the first output signal and the second output signal may be controlled (STEP 2). The first output signal may be controlled to reach the high-level current from the low-level current that the first output signal has been controlled to reach in STEP 1. The second output signal may be controlled to maintain the high-level current that the second output signal has been controlled to reach in STEP 1. That is, in STEP 2, the first output signal may be controlled to have the high-level current, and the second output signal may be controlled to have the high-level current.

After the set delay time elapses from a falling edge of a third pulse, the level of current of the first output signal and the second output signal may be controlled (STEP 3). The first output signal may be controlled to maintain the high-level current that the first output signal has been controlled to reach in STEP 2. The second output signal may be controlled to reach the low-level current from the high-level current that the second output signal has been controlled to reach in STEP 2. That is, in STEP 3, the first output signal may be controlled to have the high-level current, and the second output signal may be controlled to have the low-level current.

After the set delay time elapses from a falling edge of a fourth pulse, the level of current of the first output signal and the second output signal may be controlled (STEP 4). The first output signal may be controlled to reach the low-level current from the high-level current that the first output signal has been controlled to maintain in STEP 3. The second output signal may be controlled to maintain the low-level current that the second output signal has been controlled to reach in STEP 3. That is, in STEP 4, the first output signal may be controlled to have the low-level current, and the second output signal may be controlled to have the low-level current.

STEP 1 to STEP 4 are performed in a single cycle and may be continuously repeated while a driving sequence of the tilting actuator 830 is performed.

Table 2 below shows another example of a driving sequence of the tilting actuator 830.

TABLE 2

| STEP | First output signal X | Second output signal Y |
|---|---|---|
| 1 | (+) | (+) |
| 2 | (+) | (−) |
| 3 | (−) | (−) |
| 4 | (−) | (+) |

As shown in Table 2, the levels of current of the first output signal and the second output signal for each STEP which have been described above with reference to Table 1 and FIG. 25 are only an embodiment and may be set in different combinations. To this end, the levels of current of the first output signal and the second output signal for each STEP may be set by a control signal of the tilting controller 810. FIGS. 26 to 28 illustrate an optical path movement process according to an embodiment of the present invention.

First, in STEP 0 (neutral sequence) before a driving sequence of the tilting actuator 830 is started, the filter may maintain a non-tilted state. FIG. 27A illustrates an optical path of input light in STEP 0. In FIG. 27, a point indicates the center of a pixel with respect to the input light. In STEP 0, the center of a pixel with respect to the input light may coincide with the center of the pixel with respect to a sensor. That is, in STEP 0, an optical path of light passing through the filter does not change.

When a driving sequence of the tilting actuator 830 is started, the tilting actuator 830 may tilt the filter according to STEP 1. Due to the filter being tilted according to STEP 1, a left side upper end portion of the filter may ascend and a right side lower end portion of the filter may descend with respect to a reference plane. The reference plane may refer to a plane on which the filter is disposed in STEP 0. Ascending may refer to moving away from the sensor, and descending may refer to approaching the sensor. FIG. 27B illustrates an optical path of input light in STEP 1. When the filter is tilted according to STEP 1, the optical path of the input light may move leftward by 0.25 pixels and move upward by 0.25 pixels from a reference optical path. Then, the camera module according to an embodiment of the present invention may acquire a first frame image from the optical path that has moved according to STEP 1.

After the driving sequence of the tilting actuator 830 according to STEP 1, the tilting actuator 830 may tilt the filter according to STEP 2. Due to the filter being tilted according to STEP 2, a right side upper end portion of the filter may ascend and a left side lower end portion of the filter may descend with respect to the reference plane. Corners of the left side upper end portion and the right side lower end portion of the filter, which have ascended or descended in STEP 1, may move to reference positions. FIG. 27C illustrates an optical path of input light in STEP 2. When the filter is tilted according to STEP 2, the optical path of the input light may move rightward by 0.25 pixels and move upward by 0.25 pixels from the reference optical path. The optical path of the input light may move rightward by 0.5 pixels with respect to the optical path of the input light in STEP 1. Then, the camera module according to an embodiment of the present invention may acquire a second frame image from the optical path that has moved according to STEP 2.

After the driving sequence of the tilting actuator 830 according to STEP 2, the tilting actuator 830 may tilt the filter according to STEP 3. Due to the filter being tilted according to STEP 3, the left side upper end portion of the filter may descend and the right side lower end portion of the filter may ascend with respect to the reference plane. Corners of the right side upper end portion and the left side lower end portion of the filter, which have ascended or descended in STEP 2, may move to reference positions. FIG. 27D illustrates an optical path of input light in STEP 3. When the filter is tilted according to STEP 3, the optical path of the input light may move rightward by 0.25 pixels and move downward by 0.25 pixels from the reference optical path. The optical path of the input light may move downward by 0.5 pixels with respect to the optical path of the input light in STEP 2. Then, the camera module according to an embodiment of the present invention may acquire a third frame image from the optical path that has moved according to STEP 3.

After the driving sequence of the tilting actuator 830 according to STEP 3, the tilting actuator 830 may tilt the filter according to STEP 4. Due to the filter being tilted according to STEP 4, the right side upper end portion of the filter may ascend and the left side lower end portion of the filter may descend with respect to the reference plane. Corners of the left side upper end portion and the right side lower end portion of the filter, which have ascended or descended in STEP 3, may move to reference positions. FIG. 27E illustrates an optical path of input light in STEP 4. When the filter is tilted according to STEP 4, the optical path of the input light may move leftward by 0.25 pixels and move downward by 0.25 pixels from the reference optical path. The optical path of the input light may move leftward by 0.5 pixels with respect to the optical path of the input light in STEP 2. Then, the camera module according to an embodiment of the present invention may acquire a fourth frame image from the optical path that has moved according to STEP 4.

Although the tilting actuator has been described as having a VCM structure in which magnets and coils are applied, the present invention is not limited thereto, and the present invention may also be implemented through a variable lens such as a liquid lens that is able to control an optical path through control of a single liquid or two or more liquids (a conductive liquid and a nonconductive liquid forming a mutual interface) and an optical member that controls a thin film and a liquid to control an optical path.

FIG. 29 is a view for describing an SR image.

FIG. 29 is for describing a process of generating a single high-resolution SR image using the first to fourth frame images generated through STEP 1 to STEP 4. In FIG. 29, for convenience of description, it is assumed that each of the first to fourth frame images is a 4×4 frame image, that is, an image consisting of 16 pixels.

As illustrated in FIG. 29, pixel values of the four frame images may be arranged corresponding to movement directions of an optical path so that a single SR image is generated. That is, the 4×4 (16-pixel) first to fourth frame images may constitute a single 8×8 (64-pixel) SR image.

A pixel value arrangement process will be described by assuming that a pixel at the left side upper end of each of the first to fourth frame images is pixel 1 and a pixel at the right side lower end of each of the first to fourth frame images is pixel 16 and assuming that a pixel at the left side upper end of the SR image is pixel 1 and a pixel at the right side lower end of the SR image is pixel 64.

Pixel 1 of the first frame image that has moved leftward by 0.25 pixels and upward by 0.25 pixels from the reference optical path may be arranged as a value of pixel 1 of the SR image. Pixel 2 of the first frame image may be arranged as a value of pixel 3 of the SR image. Pixel 3 of the first frame image may be arranged as a value of pixel 5 of the SR image. Pixel 4 of the first frame image may be arranged as a value of pixel 7 of the SR image.

Pixel 1 of the second frame image that has moved rightward by 0.25 pixels and upward by 0.25 pixels from the reference optical path may be arranged as a value of pixel 2 of the SR image. Pixel 2 of the second frame image may be arranged as a value of pixel 4 of the SR image. Pixel 3 of the second frame image may be arranged as a value of pixel 6 of the SR image. Pixel 4 of the second frame image may be arranged as a value of pixel 8 of the SR image.

Pixel 1 of the third frame image that has moved rightward by 0.25 pixels and downward by 0.25 pixels from the reference optical path may be arranged as a value of pixel 9 of the SR image. Pixel 2 of the third frame image may be arranged as a value of pixel 11 of the SR image. Pixel 3 of the third frame image may be arranged as a value of pixel 13 of the SR image. Pixel 4 of the third frame image may be arranged as a value of pixel 15 of the SR image.

Pixel 1 of the fourth frame image that has moved leftward by 0.25 pixels and downward by 0.25 pixels from the reference optical path may be arranged as a value of pixel 10 of the SR image. Pixel 2 of the fourth frame image may be arranged as a value of pixel 12 of the SR image. Pixel 3 of the fourth frame image may be arranged as a value of pixel 14 of the SR image. Pixel 4 of the fourth frame image may be arranged as a value of pixel 16 of the SR image.

The pixel values of the first to fourth frame images may be arranged as described above to generate a single SR image. That is, a single image is acquired through the four images. Therefore, 100-FPS images may become a 25-FPS SR image.

Meanwhile, an image synthesizer may remove outermost pixels, that is, the shaded pixel values in FIG. 29, of the SR image to correct the SR image. The pixel values arranged at the outermost portions of the SR image may contain data irrelevant to information to be captured in a tilting process. The image synthesizer may remove the shaded outermost pixels to remove the data irrelevant to the information to be captured.

Embodiments of the present invention have been described above with reference to the accompanying drawings, but those of ordinary skill in the art to which the present invention pertains should understand that the present invention may be embodied in other specific forms without changing the technical spirit or essential features thereof. Therefore, the embodiments described above should be understood as being illustrative, instead of limiting, in all aspects.

The invention claimed is:

1. A camera module comprising:
a light emitting portion configured to output light to an object;
a filter configured to cause the light to pass therethrough;
at least one lens disposed on the filter to condense the light reflected from the object;
a sensor including a plurality of pixels arranged in an array and configured to generate an electrical signal from the light condensed by the lens; and
a tilting portion configured to tilt the filter so that an optical path of the light that passes through the filter repeatedly moves according to a predetermined rule,
wherein the tilting portion includes a tilting driver configured to, on the basis of a trigger signal input from the sensor, generate an output signal synchronized with an integration time of the sensor and a tilting actuator configured to tilt the filter in a diagonal direction through the output signal, and
wherein the tilting actuator includes first to fourth driving portions disposed to surround side surfaces of the filter in four directions, and the first to fourth driving portions tilt edges of the filter in a vertical direction according to an electrical signal.

2. The camera module of claim 1, wherein the tilting actuator includes:
a housing;
an elastic member connected to the housing;
a holder connected to the elastic member and the filter; and
a lens module coupled to the housing,
wherein the first to fourth driving portions include:
a first magnet, a second magnet disposed opposite to the first magnet, a third magnet, and a fourth magnet disposed opposite to the third magnet, the first to fourth magnets being disposed in the holder; and
a first coil facing the first magnet, a second coil facing the second magnet, a third coil facing the third magnet, and a fourth coil facing the fourth magnet.

3. The camera module of claim 2, wherein a direction of a force generated due to an interaction between the first magnet and the first coil is a direction opposite to a direction of a force generated due to an interaction between the second magnet and the second coil.

4. The camera module of claim 2, wherein a direction of a force generated due to an interaction between the third magnet and the third coil is a direction opposite to a direction of a force generated due to an interaction between the fourth magnet and the fourth coil.

5. The camera module of claim 2, wherein the first coil and the third coil are disposed in an antiparallel structure in which directions of current flowing in the coils are opposite to each other.

6. The camera module of claim 2, wherein the second coil and the fourth coil are disposed in an antiparallel structure in which directions of current flowing in the coils are opposite to each other.

7. The camera module of claim 2, wherein the output signal includes:
a first output signal input to the first coil and the third coil; and
a second output signal input to the second coil and the fourth coil.

8. The camera module of claim 7, wherein the predetermined rule includes a first tilt sequence, a second tilt sequence, a third tilt sequence, and a fourth tilt sequence in which an optical path of the light that passes through the filter is disposed at different positions.

9. The camera module of claim 8, wherein the tilting portion tilts the filter so that any one combination in which the first to fourth tilt sequences are sequentially performed is repeated.

10. The camera module of claim 8, wherein, in each of the first to fourth tilt sequences, the first output signal and the second output signal output a high-level current value whose level is higher than a predetermined reference current level or output a low-level current value whose level is lower than the reference current level.

11. The camera module of claim 10, wherein the first output signal and the second output signal output current values of different levels in the first tilt sequence and the third tilt sequence.

12. The camera module of claim 10, wherein the first output signal and the second output signal output current values of the same level in the second tilt sequence and the fourth tilt sequence.

13. The camera module of claim 10, wherein:
the first output signal outputs the low-level current value in the first tilt sequence; and
the second output signal outputs the high-level current value in the first tilt sequence.

14. The camera module of claim 10, wherein:
the first output signal outputs the high-level current value in the second tilt sequence; and
the second output signal outputs the high-level current value in the second tilt sequence.

15. The camera module of claim 10, wherein:
the first output signal outputs the high-level current value in the third tilt sequence; and
the second output signal outputs the low-level current value in the third tilt sequence.

16. The camera module of claim 10, wherein:
the first output signal outputs the low-level current value in the fourth tilt sequence; and
the second output signal outputs the low-level current value in the fourth tilt sequence.

17. The camera module of claim 10, wherein the trigger signal is a pulse signal having a predetermined cycle.

18. The camera module of claim 17, wherein each of the first tilt sequence and the fourth tilt sequence is controlled between a falling edge of a first pulse and a falling edge of a second pulse of the trigger signal that are consecutive.

19. The camera module of claim 17, wherein, in the first output signal and the second output signal, the level of current of the first tilt sequence to the fourth tilt sequence is controlled after a set delay time elapses with respect to a falling edge of a pulse of the trigger signal.

20. The camera module of claim 10, wherein the high-level current value and the low-level current value are independently set in each of the first to fourth tilt sequences.

* * * * *